US012614356B2

(12) United States Patent
Xiong

(10) Patent No.: US 12,614,356 B2
(45) Date of Patent: Apr. 28, 2026

(54) VIDEO SEE-THROUGH AUGMENTED REALITY

(71) Applicant: Samsung Electronics Co., Ltd.,
Suwon-si (KR)

(72) Inventor: Yingen Xiong, Mountain View, CA (US)

(73) Assignee: Samsung Electronics Co., Ltd.,
Suwon-si (KR)

( * ) Notice: Subject to any disclaimer, the term of this patent is extended or adjusted under 35 U.S.C. 154(b) by 156 days.

(21) Appl. No.: 18/136,211

(22) Filed: Apr. 18, 2023

(65) Prior Publication Data

US 2024/0046576 A1     Feb. 8, 2024

Related U.S. Application Data

(60) Provisional application No. 63/412,616, filed on Oct. 3, 2022, provisional application No. 63/396,430, filed
(Continued)

(51) Int. Cl.
G06T 19/00          (2011.01)
G02B 27/01          (2006.01)
(Continued)

(52) U.S. Cl.
CPC ........ G06T 19/006 (2013.01); G02B 27/0172 (2013.01); G06T 5/80 (2024.01);
(Continued)

(58) Field of Classification Search
CPC ........... G06T 19/006; G06T 7/80; G06T 7/85; G06T 2207/30244; G02B 27/0172;
(Continued)

(56) References Cited

U.S. PATENT DOCUMENTS 6,618,076 B1 *   9/2003   Sukthankar ............ H04N 17/04
                                                      348/E17.005
6,791,616 B2 *   9/2004   Tamaki .................. H04N 23/81
                                                      356/124
(Continued)

FOREIGN PATENT DOCUMENTS

CN          102110300 A       6/2011
CN          111007939 A       4/2020
(Continued)

OTHER PUBLICATIONS

Lee, S., & Hua, H. (2014). A robust camera-based method for optical distortion calibration of head-mounted displays. Journal of Display Technology, 11(10), 845-853.*
(Continued)

*Primary Examiner* — Sarah Lhymn

(57)          ABSTRACT

In one embodiment, a method includes capturing, by a calibration camera, a calibration pattern displayed on a display of a video see-through AR system, where the calibration camera is located at an eye position for viewing content on the video see-through AR system. The method further includes determining, based on the captured calibration pattern, one or more system parameters of the video see-through AR system that represent combined distortion caused by a display lens of the video see-through AR system and caused by a camera lens of the see-through camera; determining, based on the one or more system parameters and on one or more camera parameters that represent distortion caused by the see-through camera, one or more display-lens parameters that represent distortion caused by the display lens; and storing the one or more system parameters and the one more display-lens parameters as a calibration for the system.

12 Claims, 26 Drawing Sheets

Related U.S. Application Data on Aug. 9, 2022, provisional application No. 63/395,529, filed on Aug. 5, 2022.

(51) Int. Cl.

| | |
|---|---|
| *G06T 5/80* | (2024.01) |
| *G06T 7/593* | (2017.01) |
| *G06T 7/80* | (2017.01) |
| *H04N 13/111* | (2018.01) |
| *H04N 13/117* | (2018.01) |
| *H04N 13/239* | (2018.01) |
| *H04N 13/246* | (2018.01) |
| *H04N 13/257* | (2018.01) |
| *H04N 13/327* | (2018.01) |
| *H04N 13/344* | (2018.01) |
| *H04N 13/383* | (2018.01) |
| *H04N 13/00* | (2018.01) |

(52) U.S. Cl.
CPC .............. *G06T 7/593* (2017.01); *G06T 7/80* (2017.01); *G06T 7/85* (2017.01); *H04N 13/111* (2018.05); *H04N 13/117* (2018.05); *H04N 13/239* (2018.05); *H04N 13/246* (2018.05); *H04N 13/257* (2018.05); *H04N 13/327* (2018.05); *H04N 13/344* (2018.05); *H04N 13/383* (2018.05); *G02B 2027/0138* (2013.01); *G06T 2207/10021* (2013.01); *G06T 2207/10024* (2013.01); *G06T 2207/30244* (2013.01); *H04N 2013/0081* (2013.01)

(58) Field of Classification Search
CPC ...... G02B 2027/0138; G02B 2027/014; H04N 13/111; H04N 13/117; H04N 13/239; H04N 13/246; H04N 13/327; H04N 13/344; H04N 13/383
See application file for complete search history.

(56) References Cited

U.S. PATENT DOCUMENTS

| | | | | |
|---|---|---|---|---|
| 7,889,234 | B2 | 2/2011 | Williams | |
| 9,264,702 | B2 | 2/2016 | Liu | |
| 9,630,105 | B2 | 4/2017 | Stafford | |
| 10,198,865 | B2 | 2/2019 | Kezele | |
| 10,445,860 | B2 | 10/2019 | Fix | |
| 10,475,196 | B2 | 11/2019 | Price | |
| 10,552,984 | B2 * | 2/2020 | Virodov | G06T 7/74 |
| 10,928,901 | B2 | 2/2021 | Park | |
| 11,158,108 | B2 | 10/2021 | Bleyer | |
| 11,232,593 | B2 | 1/2022 | Yamashita | |
| 11,233,986 | B1 | 1/2022 | Yoon | |
| 11,321,874 | B2 | 5/2022 | Araújo | |
| 11,348,208 | B2 | 5/2022 | Yamazaki | |
| 11,348,281 | B1 | 5/2022 | Tang | |
| 11,354,787 | B2 | 6/2022 | Selstad | |
| 11,367,226 | B2 | 6/2022 | Navab | |
| 11,386,572 | B2 | 7/2022 | Azimi | |
| 11,900,579 | B2 | 2/2024 | Merrell | |
| 2008/0292131 | A1 * | 11/2008 | Takemoto | H04N 13/246 |
| | | | | 382/100 |
| 2013/0194304 | A1 | 8/2013 | Latta | |
| 2014/0300708 | A1 * | 10/2014 | Iversen | H04N 9/3102 |
| | | | | 348/51 |

| | | | | |
|---|---|---|---|---|
| 2016/0012643 | A1 | 1/2016 | Kezele | |
| 2016/0127718 | A1 | 5/2016 | Hulsey | |
| 2017/0124713 | A1 | 5/2017 | Jurgenson | |
| 2018/0045963 | A1 | 2/2018 | Hoover | |
| 2019/0058870 | A1 | 2/2019 | Rowell | |
| 2019/0080517 | A1 | 3/2019 | You | |
| 2019/0108653 | A1 * | 4/2019 | Virodov | G06T 7/74 |
| 2019/0158813 | A1 * | 5/2019 | Rowell | H04N 13/111 |
| 2019/0287259 | A1 | 9/2019 | Tankovich | |
| 2019/0339369 | A1 * | 11/2019 | Fenton | G06T 7/001 |
| 2019/0387218 | A1 | 12/2019 | Trail | |
| 2020/0143524 | A1 | 5/2020 | Selstad | |
| 2020/0209628 | A1 * | 7/2020 | Sztuk | G02B 27/0176 |
| 2020/0241730 | A1 | 7/2020 | DiVerdi | |
| 2020/0342675 | A1 | 10/2020 | Leuze | |
| 2021/0014475 | A1 | 1/2021 | Lee | |
| 2021/0142508 | A1 | 5/2021 | Azimi | |
| 2021/0375000 | A1 * | 12/2021 | Burns | G06T 3/12 |
| 2022/0159196 | A1 | 5/2022 | Lee | |
| 2022/0222842 | A1 | 7/2022 | McCombe | |
| 2022/0354582 | A1 | 11/2022 | Spaas | |
| 2023/0377197 | A1 | 11/2023 | Napolskikh | |

FOREIGN PATENT DOCUMENTS

| | | | |
|---|---|---|---|
| EP | 3200148 | A1 | 8/2017 |
| JP | 2000102036 | A | 4/2000 |
| KR | 10-0777215 | B1 | 11/2007 |
| KR | 10-1222155 | B1 | 1/2013 |
| KR | 10-2016-0121798 | A | 10/2016 |
| KR | 20160121798 | A | 10/2016 |
| KR | 10-2017-0118609 | A | 10/2017 |
| KR | 10-2019-0027950 | A | 3/2019 |
| KR | 10-2020-0005999 | A | 1/2020 |
| KR | 20200098509 | A | 8/2020 |
| KR | 10-2185519 | B1 | 12/2020 |
| KR | 10-2021-0153016 | A | 12/2021 |
| WO | WO 2016/037014 | A1 | 3/2016 |
| WO | WO 2016-073557 | A1 | 5/2016 |
| WO | WO 2021-141887 | A1 | 7/2021 |
| WO | WO-2023049944 | A2 | 4/2023 |

OTHER PUBLICATIONS

PCT Search Report and Written Opinion in Application No. PCT/KR2023/010306, Oct. 24, 2023.

PCT Search Report and Written Opinion in Application No. PCT/KR2023/010310, Oct. 20, 2023.

PCT Search Report and Written Opinion in Application No. PCT/KR2023/010298, Oct. 20, 2023.

Non-final office action in U.S. Appl. No. 18/136,228, Mar. 7, 2025.

Non-final office action in U.S. Appl. No. 18/135,985, Mar. 6, 2025.

Extended European Search Report in Application No. 23850299.1-1207 / 4505708 PCT/KR 2023010298, Jun. 17, 2025.

Extended European Search Report in Application No. 23850300.7-1207 / 4505707 PCT/KR 2023010306, Jun. 13, 2025.

Extended European Search Report in Application No. 23850301.5-1207 / 4505423 PCT/KR 2023010310, May 20, 2025.

Final office action in U.S. Appl. No. 18/135,985, Jun. 16, 2025.

Final office action in U.S. Appl. No. 18/136,228, Jun. 18, 2025.

Non-final office action in U.S. Appl. No. 18/135,985, Nov. 10, 2025.

Non-final office action in U.S. Appl. No. 18/136,228, Nov. 24, 2025.

Final office action in U.S. Appl. No. 18/135,985, Mar. 2, 2026.

Final office action in U.S. Appl. No. 18/136,228, Mar. 19, 2026.

* cited by examiner

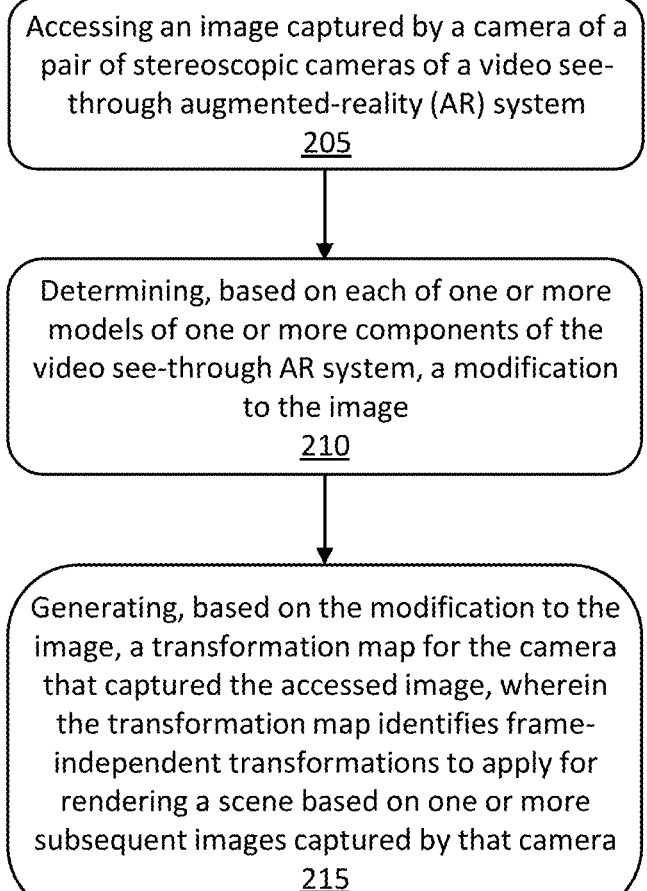

Accessing an image captured by a camera of a pair of stereoscopic cameras of a video see-through augmented-reality (AR) system
205

Determining, based on each of one or more models of one or more components of the video see-through AR system, a modification to the image
210

Generating, based on the modification to the image, a transformation map for the camera that captured the accessed image, wherein the transformation map identifies frame-independent transformations to apply for rendering a scene based on one or more subsequent images captured by that camera
215

Fig. 2

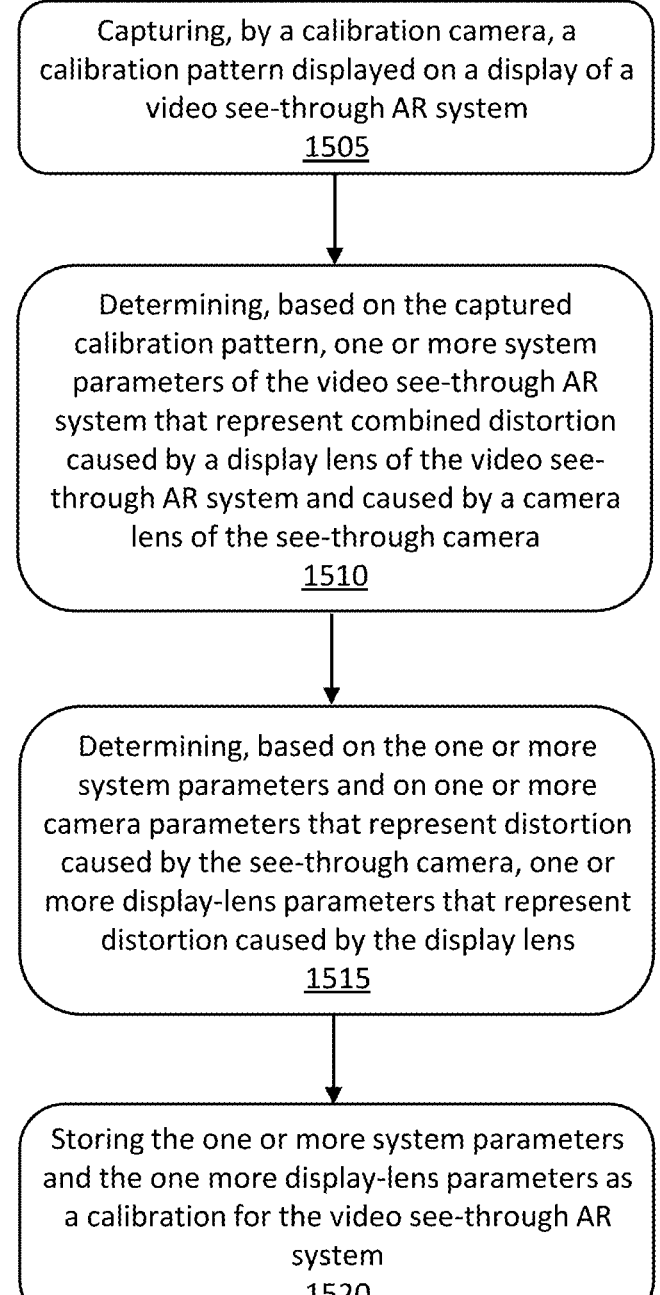

Capturing, by a calibration camera, a calibration pattern displayed on a display of a video see-through AR system
1505

Determining, based on the captured calibration pattern, one or more system parameters of the video see-through AR system that represent combined distortion caused by a display lens of the video see-through AR system and caused by a camera lens of the see-through camera
1510

Determining, based on the one or more system parameters and on one or more camera parameters that represent distortion caused by the see-through camera, one or more display-lens parameters that represent distortion caused by the display lens
1515

Storing the one or more system parameters and the one more display-lens parameters as a calibration for the video see-through AR system
1520

Fig. 15

1708 Display

1701 Headset

1707 See-Through Camera Lens

1706 See-Through Camera

1705 Display Panel

1704 Display Lens

1703 Eye Viewpoint

1702 Calibration Camera

1700

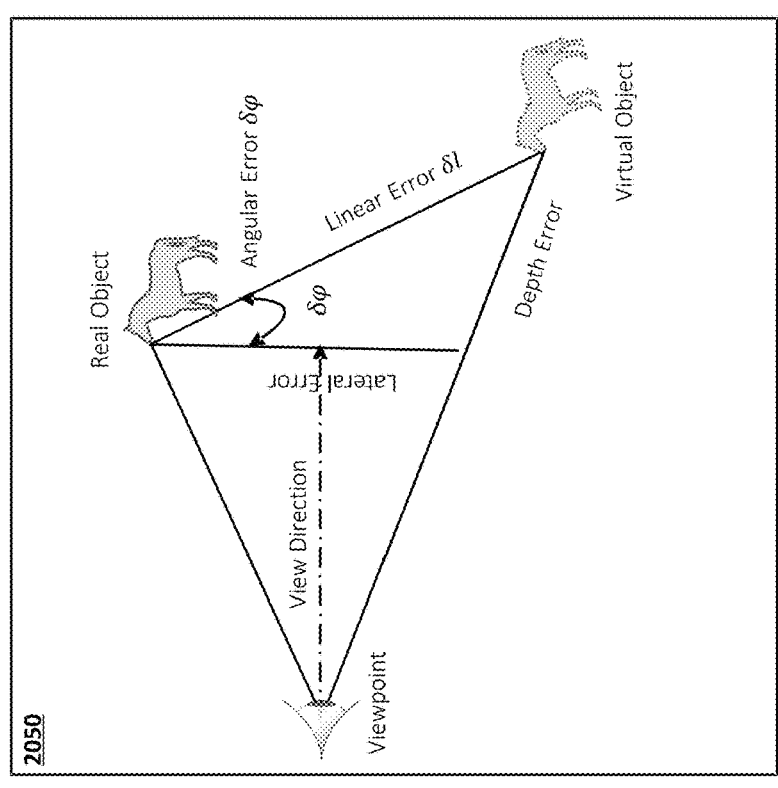
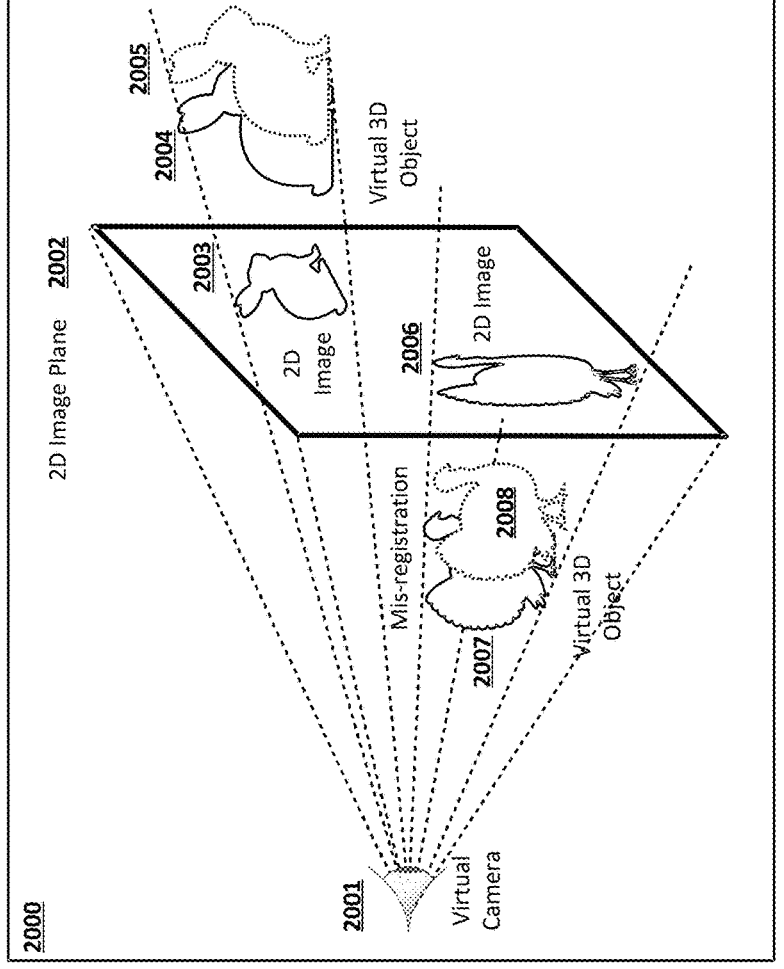
Fig. 20

Figure 21:
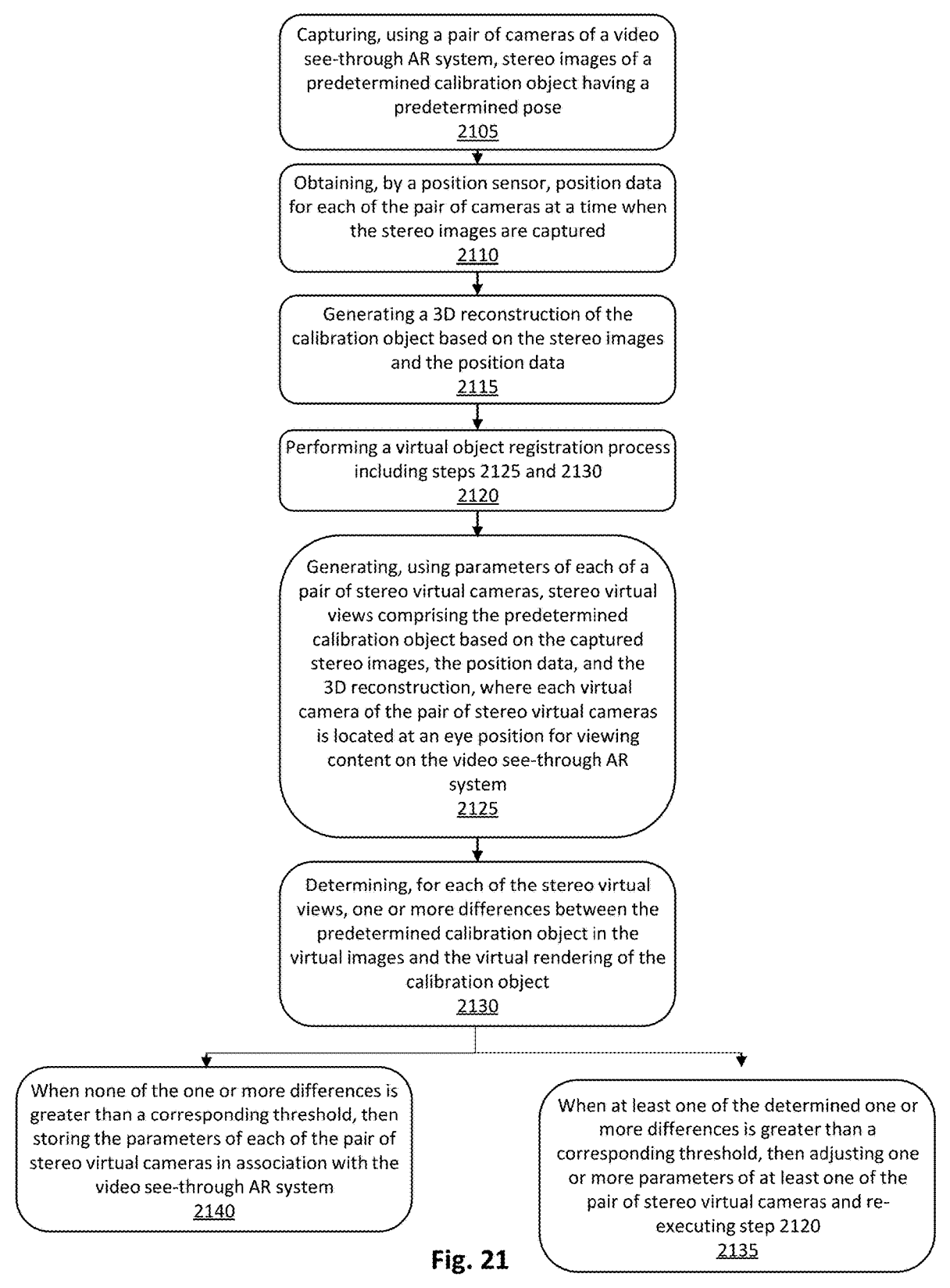

Capturing, using a pair of cameras of a video see-through AR system, stereo images of a predetermined calibration object having a predetermined pose
2105

Obtaining, by a position sensor, position data for each of the pair of cameras at a time when the stereo images are captured
2110

Generating a 3D reconstruction of the calibration object based on the stereo images and the position data
2115

Performing a virtual object registration process including steps 2125 and 2130
2120

Generating, using parameters of each of a pair of stereo virtual cameras, stereo virtual views comprising the predetermined calibration object based on the captured stereo images, the position data, and the 3D reconstruction, where each virtual camera of the pair of stereo virtual cameras is located at an eye position for viewing content on the video see-through AR system
2125

Determining, for each of the stereo virtual views, one or more differences between the predetermined calibration object in the virtual images and the virtual rendering of the calibration object
2130

When none of the one or more differences is greater than a corresponding threshold, then storing the parameters of each of the pair of stereo virtual cameras in association with the video see-through AR system
2140

When at least one of the determined one or more differences is greater than a corresponding threshold, then adjusting one or more parameters of at least one of the pair of stereo virtual cameras and re-executing step 2120
2135

2301
World Coordinate System

2302
Camera Tracking Coordinate System

2303
HMD Marker Coordinate System

2304
See-Through Camera Coordinate System

2305
Virtual Camera Coordinate System

Pose Tracking Camera 2310

3D Object 2311

See-Through Camera 2312

HMD Marker 2313

Display Panel 2314

Display Lens 2315

Eye Viewpoint and Virtual camera 2316

VIDEO SEE-THROUGH AUGMENTED REALITY

PRIORITY CLAIM

This application claims the benefit under 35 U.S.C. 119 of U.S. Provisional Patent Application Nos. 63/396,430 filed Aug. 9, 2022; 63/395,529 filed Aug. 5, 2022; and 63/412,616 filed Oct. 3, 2022, which are incorporated by reference herein.

TECHNICAL FIELD

This application generally relates to video see-through augmented reality.

BACKGROUND

Video see-through augmented reality (AR) outputs images, such as video, of a real-world environment along with one or more virtual objects. One or more cameras, such as a pair of stereoscopic cameras, capture images of the physical environment in the vicinity of the camera(s). One or more virtual objects may be superimposed on at least some of the images captured by the one or more cameras. For example, a portion of a graphical user interface (GUI) may be superimposed on at least some of the images. As another example, a virtual animal, tool, display, etc. may be superimposed on at least some of the images.

In contrast to optical see-through systems, which pass light from the physical environment in the vicinity of the optical see-through system through one or more lenses such that the light remains in the vicinity of the optical see-through system, video see-through systems generate video of the environment in the vicinity of the camera(s). This video may therefore be displayed on any suitable display, which may also be in the vicinity of the camera(s) (e.g., as part of a head-worn display system), may be remote from the camera(s) (e.g., may be video displayed on a device that is not in the vicinity of the camera(s)), and/or may be part of an integrated device that includes at least some of the camera(s) (e.g., a video headset may include at least a pair of cameras and may include a display for displaying video from the cameras, along with any superimposed virtual objects).

BRIEF DESCRIPTION OF THE DRAWINGS

FIG. 2 illustrates an example method for correcting image transformations caused by components of a video see-through AR system.

FIG. 15 illustrates an example method for calibrating a video see-through AR system.

FIG. 20 illustrates examples of virtual object mis-registration.

FIG. 21 illustrates an example method for virtual object registration.

DESCRIPTION OF EXAMPLE EMBODIMENTS

Figure 1:
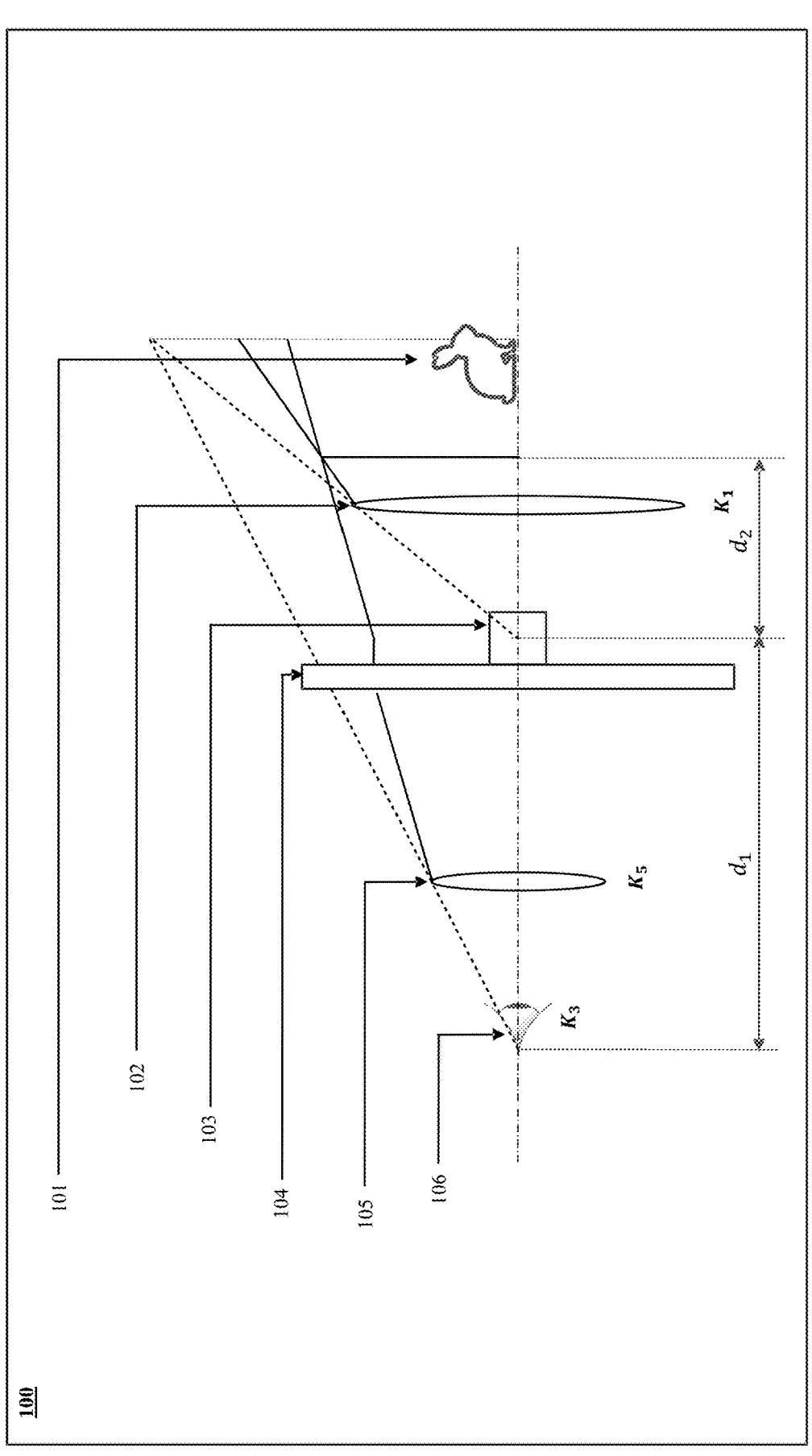
FIG. 1 illustrates an example representation of a video see-through AR system.

FIG. 1 illustrates an example representation of a video see-through AR system 100. A target object 101 in the environment of the system 100 is captured by a see-through camera 103, which includes a see-through camera lens 102 through which the light from object 101 passes. In the example of FIG. 1, system 100 includes a display panel 104 for displaying video AR content to a user. For example, system 100 may be a headset worn by a user. Content displayed on display panel 104 passes through display lens 105 and reaches a user eye viewpoint 106.

As illustrated in the example of FIG. 1, light from target object 101 passes through a series of system components, and when the light reaches eye viewpoint 106, it has been transformed (e.g., distorted) by system 100. The overall transformation created by system 100 can be considered to be a series of separate transformations performed by the individual components. For example, one transformation may be caused by the see-through camera itself, which may be modeled using a see-through camera model $K_1$. As another example, light may be transformed by the display lens, which may be modeled using a display lens model $K_5$. As another example, a user's view 106 of the displayed content on display 104 can be modeled as a virtual camera, for example using a virtual camera model $K_3$ at the user's viewing location (i.e., the location of the user's eye for viewing content on the display). FIG. 1 illustrates an example representation of a video see-through AR system for a single camera and a single eye, and this representation applies for a system that uses multiple cameras and displays content to both eyes. For example, for a system that displays stereoscopic images, a separate model may be made for each camera, for each display lens, and for each virtual camera corresponding to each location of the user's eyes.

FIG. 2 illustrates an example method for correcting image transformations caused by components of a video see-through AR system. As explained herein, the method of FIG. 2 creates a transformation map prior to real-time image rendering. This can significantly speed up the image-rendering process when a user is using a video see-through AR system, as the transformations that must be implemented for a given image frame in order to correct the distortions caused by the system components do not need to be determined for each frame during rendering, which is a time-sensitive process. For example, if latency is introduced to the rendering process, then displayed content may not temporally match the movements of the system. For example, if a user is wearing a head-worn device and suddenly turns their head, then latency in the rendering stage results in delayed movement of displayed content relative to the user's head motion, resulting in inaccurate scene display and potentially causing disorienting sensations, such as dizziness, in a user viewing the content.

Step 205 of the example method of FIG. 2 includes accessing an image captured by a camera of a pair of stereoscopic cameras of a video see-through augmented-reality (AR) system. In particular embodiments, step 205 may include capturing the initial image, e.g., with the camera of the pair of stereoscopic cameras. In particular embodiments, step 205 may include accessing the image from a memory of a client or a server computing device, and may include receiving the image from another electronic device, such as over a Wi-Fi or Bluetooth connection. In particular embodiments, the steps of the example method of FIG. 2 may be performed by a single computing device, or may be performed by more than one computing device. For example, some or all of the steps of the example method of FIG. 2 may be performed by the video see-through system, e.g., by one or more computers integrated within that system. As another example, some or all of the steps of the example method of FIG. 2 may be performed by one or more other computing devices. For example, some or all of the steps may be performed by a server device or by a client device (e.g., a personal computer, a smartphone, etc.).

As illustrated in the example method of FIG. 2, a camera may be one of a pair of stereoscopic cameras, which may ultimately be used to display three-dimensional content to a user. For example, a left camera may be used to capture a left image of a scene and a right camera may be used to capture a right image of the scene. The left image may be displayed to a user's left eye (e.g., through a left display lens, such as illustrated in the example of FIG. 1) and the right image may be displayed to a user's right eye, e.g., through a separate right display lens for that eye. In particular embodiments, one or more pairs of stereoscopic cameras may be integrated into an overall display system, such as for example a headset that includes a display structure for viewing captured content and AR/VR content. While the example method of FIG. 2 describes a process for an image taken by one camera of a pair of stereoscopic cameras, the same method may be use for the other camera, although as described herein, the particular model parameters used to generate a transformation map for that camera may differ, e.g., due to physical differences in the two cameras or in the associated display lenses, etc.

Figure 3:
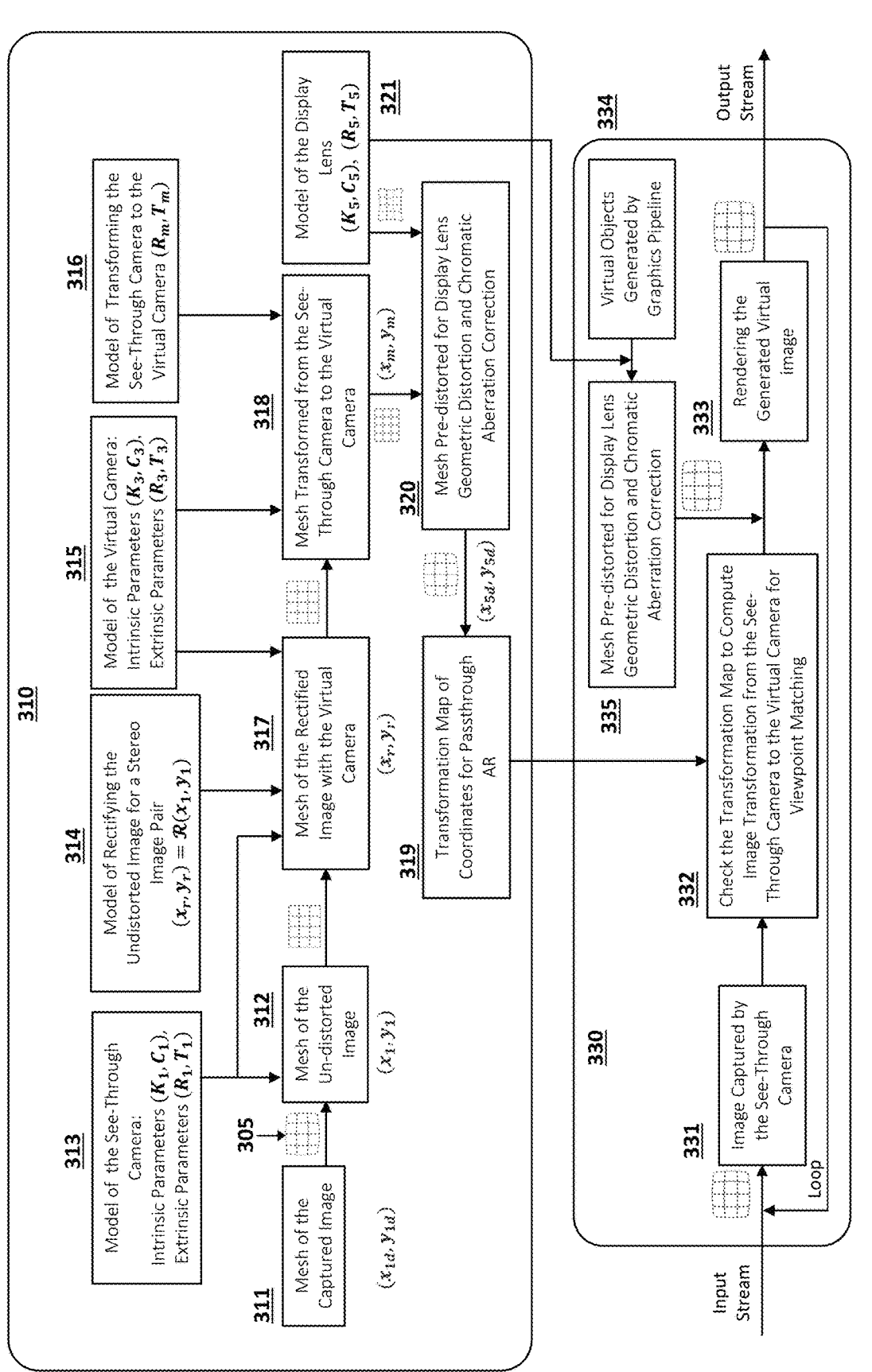
FIG. 3 illustrates an example approach that implements the example method of FIG. 2.

Step 210 of the example method of FIG. 2 includes determining, based on each of one or more models of one or more components of the video see-through AR system, a modification to the image. FIG. 3 illustrates an example approach that implements the example method of FIG. 2.

In FIG. 3, process 310 illustrates a specific implementation of the example method of FIG. 2. As explained more fully herein, this process generates a transformation map 319, which identifies frame-independent transformations to apply for rendering one or more subsequent images captured by that camera. This transformation map is generated prior to rendering of subsequent images, such that the corrective transformations for the video see-through AR system need not be determined during the rendering process, thereby improving latency and conserving computational resources during rendering. As described more fully below, process 330 illustrates an example rendering process.

As long as the video see-through system configuration does not change, process 310 provides an accurate transformation map 319 to use for any subsequent image rendering. This process is device-specific, in that any particular instance of a device will need to undergo process 310 in order to determine the transformation map for that particular device, due to, e.g., physical differences in the installation and the components used. If the system does appreciably change, e.g., the system is a headset and a user drops their headset, then process 310 may need to be repeated to generate an updated transformation map. In particular embodiments, a camera calibration and/or a system calibration (e.g., as described more fully below) may be run prior to executing process 310, for example in order to determine camera properties and/or lens properties for a particular system. In particular embodiments, process 310 may be run for a system prior to the system's deployment, e.g., by a manufacturer of the system, and the resulting transformation map may be associated with the particular system corresponding to the transformation map, e.g., by storing the map as a file on the system or in an online location associated with the system.

In the example of FIG. 3, after an image captured by a camera is accessed, a mesh (such as a grid) 311 is created using the image coordinates. This disclosure contemplates that the mesh may take any suitable shape (e.g., rectangular, triangular, etc.) and may be of any suitable size. In particular embodiments, the accessed image may be an image of a known scene, e.g., a calibration image taken by the camera. In particular embodiments, the accessed image may be any suitable image taken by the camera. In the example of FIG. 3, the method of FIG. 2's step of determining, based on each of one or more models of one or more components of the video see-through AR system, a modification to the image may include creating a mesh of coordinates from a captured image, and then subsequent transformation are determined by using only the mesh, i.e., the transformations are not reliant on any particular image or frame captured by the camera, and the transformations apply generally to image coordinates of images captured by that camera.

In particular embodiments, a mesh may be of any suitable size, and the mesh-element size may be larger than an image's pixel size. For example, for an image with 3,000× 3,000 pixels, a grid of 300×300 elements may be used, such that each grid element corresponds to a 10×10 block of image pixels, although these images and grid sizes, as well as their relative sizes, are just examples. In particular embodiments, to determine the transformation for each pixel in a subsequent image during rendering, a GPU may interpolate grid points in the transformation map to determine the appropriate transformation for that pixel.

FIG. 3 illustrates an example mesh 305 that has been distorted, e.g., by a lens associated with the camera capturing the image. In particular embodiments, step 210 of the example method of FIG. 2 includes creating a mesh 312 of the undistorted image using a computational model of the see-through camera's transformative effect on the captured image. As illustrated in the example of FIG. 3, the model of the see-through camera may be based on intrinsic parameters ($K_1$, $C_1$), extrinsic parameters ($R_1$, $T_1$), or both.

Figure 4:
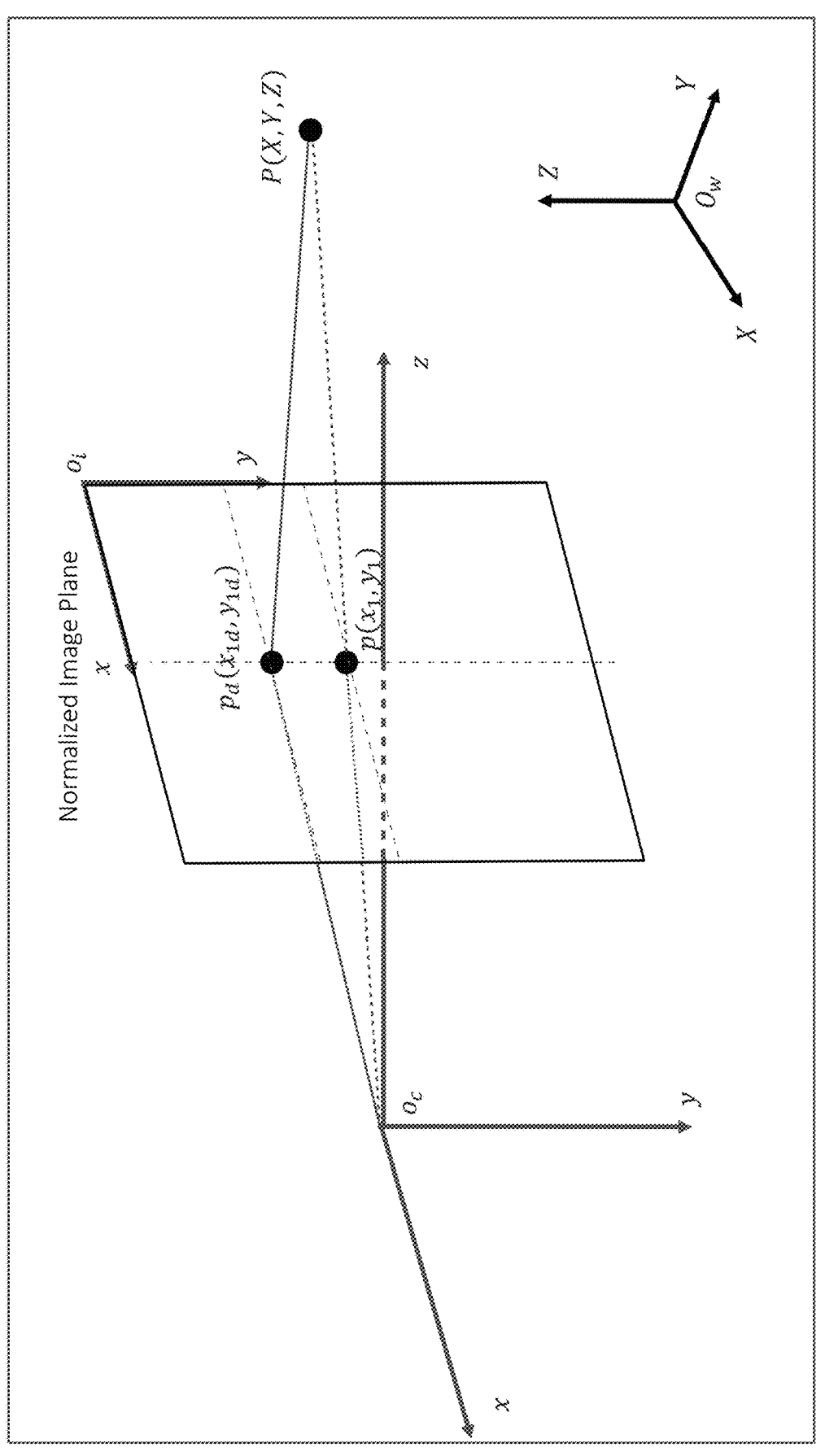
FIG. 4 illustrates an example model for a video see-through camera.

FIG. 4 illustrates an example model for a video see-through camera. In the example of FIG. 4, $O_w$ (X, Y, Z) is the world coordinate system, $O_c$(x, y, z) is the camera coordinate system, and $o_i$(x, y) is the image coordinate system. The camera matrix of the see-through camera is:

$$K_1 = \begin{bmatrix} f_{1x} & s_1 & c_{1x} \\ 0 & f_{1y} & c_{1y} \\ 0 & 0 & 1 \end{bmatrix} \quad (1)$$

where ($f_{1x}$, $f_{1y}$) represent focal lengths, ($c_{1x}$, $c_{1y}$) represent optical centers, and $s_1$ represents a skew coefficient.

In FIG. 4, $P(X_1, Y_1, Z_1)$ is a point in 3D space. If there is no lens distortion, the projection of the point on the image is $p(x_1, y_1)$. However, since the camera lens creates distortion, the projection of the point on the image is $p_d$ ($x_{1d}$, $y_{1d}$, $z_{1d}$). A lens-distortion model identifies the relationship between $p(x_1, y_1)$ and $p_d(x_{1d}, y_{1d}, z_{1d})$ using a lens-distortion coefficient that can be obtained by camera calibration:

$$\begin{cases} x_{1d} = x_1\left(1 + k_{11}r_1^2 + k_{12}r_1^4 + k_{13}r_1^6\right) + \left[2p_{11}x_1y_1 + p_{12}\left(r_1^2 + 2x_1^2\right)\right] \\ y_{1d} = y_1\left(1 + k_{11}r_1^2 + k_{12}r_1^4 + k_{13}r_1^6\right) + \left[p_{11}\left(r_1^2 + 2y_1^2\right) + 2p_{12}x_1y_1\right] \end{cases} \quad (2)$$

where the terms in square brackets represent tangential distortion and the remaining terms represent radial distortion. In equation 2, ($x_{1d}$, $y_{1d}$) are distorted coordinates, ($x_1$, $y_1$) are undistorted coordinates, ($k_{11}$, $k_{12}$, $k_{13}$) represent radial distortion coefficients, and $$r_1^2 = x_1^2 + y_1^2,$$

and ($p_{11}$, $p_{12}$) represent tangential distortion coefficients. Equation (2) can be expressed as:

$$\begin{pmatrix} x_{1d} \\ y_{1d} \end{pmatrix} = \mathcal{F}\left(\begin{pmatrix} x_1 \\ y_1 \end{pmatrix}\right) \quad (3a)$$

$$\begin{pmatrix} x_1 \\ y_1 \end{pmatrix} = \mathcal{F}^{-1}\left(\begin{pmatrix} x_{1d} \\ y_{1d} \end{pmatrix}\right) \quad (3b)$$

where $\mathcal{F}^{-1}(\cdot)$ is the inverse of $\mathcal{F}(\cdot)$. The distortion model can then be expressed as $C_1 = (k_{11}\ k_{12}\ p_{11}\ p_{12}\ k_{13})$. As a result, the see-through camera model is ($K_1$, $C_1$). Having obtained the model, it can be used to undo distortion caused by a see-through camera, for example as illustrated in FIG. 3. For example, a look-up table can be created by pre-computing the undistorted grid from the distorted grid using the model described herein, and this may be used to undo distortion in each subsequent frame from the camera, e.g., during rendering such as the rendering process 330 of FIG. 3.

In particular embodiments, step 210 of the example method of FIG. 2 includes rectifying the initial image, for example by creating a rectified mesh 317 of the image by using one or more of a model 314 of a see-through camera capturing the image, a rectification model, and a model of a virtual camera corresponding to that image (i.e., a "right" virtual camera if the image corresponds to the right side of the system).

The purpose of image rectification to transform an image pair to a plane and align their corresponding epipolar lines, as represented by:

$$(x_r, y_r) = \mathcal{R}(x_1, y_1)$$

where ($x_1$, $y_1$) is the coordinate of the undistorted image and ($x_r$, $y_r$) is the coordinate of the rectified image.

Figure 5:
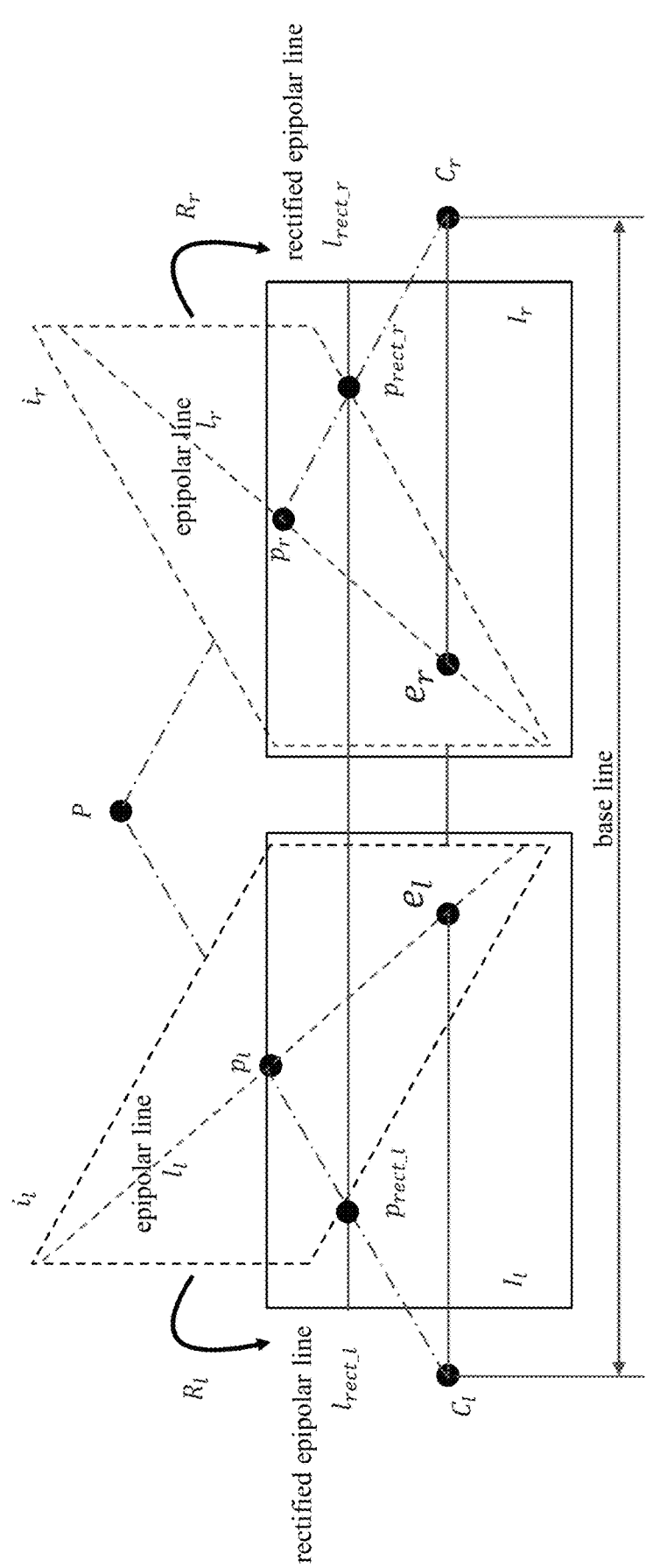
FIG. 5 illustrates an example model for image rectification.

FIG. 5 illustrates an example geometric model for image rectification. The original stereo image pair ($i_l$, $i_r$) is captured by the stereo camera pair ($C_l$, $C_r$). Rectification transforms the stereo image pair ($i_l$, $i_r$) of the see-through camera pair to the virtual camera pair ($l_l$, $l_r$), such that the epipolar line pair ($l_l$, $l_r$) is transformed to the rectified epipolar line pair ($l_{rect\_l}$, $l_{rect\_r}$) in which the rectified epipolar lines are parallel and aligned. Thus, the see-through camera pair is rectified to the virtual camera pair. In order to make this transformation, the position and orientation of the virtual camera pair is used as input.

Stereo camera calibration provides the pose of the right camera relative to the left camera:

$$S_r = [R_r, T_r] \quad (4)$$

The intrinsic parameters of the left camera are represented as:

$$K_l = \begin{bmatrix} f_{xl} & s_l & c_{xl} \\ 0 & f_{yl} & c_{yl} \\ 0 & 0 & 1 \end{bmatrix} \quad (5)$$

and the intrinsic parameters of the right camera are represented as:

$$K_r = \begin{bmatrix} f_{xr} & s_r & c_{xr} \\ 0 & f_{yr} & c_{yr} \\ 0 & 0 & 1 \end{bmatrix} \quad (6)$$

Particular embodiments may use two steps to rectify the stereo image pair ($l_l$, $l_r$) to ($l_l$, $l_r$), including converting original image points to the rectification camera coordinate system and mapping the original image points to the image plane of the rectification camera coordinate system.

Figure 6:
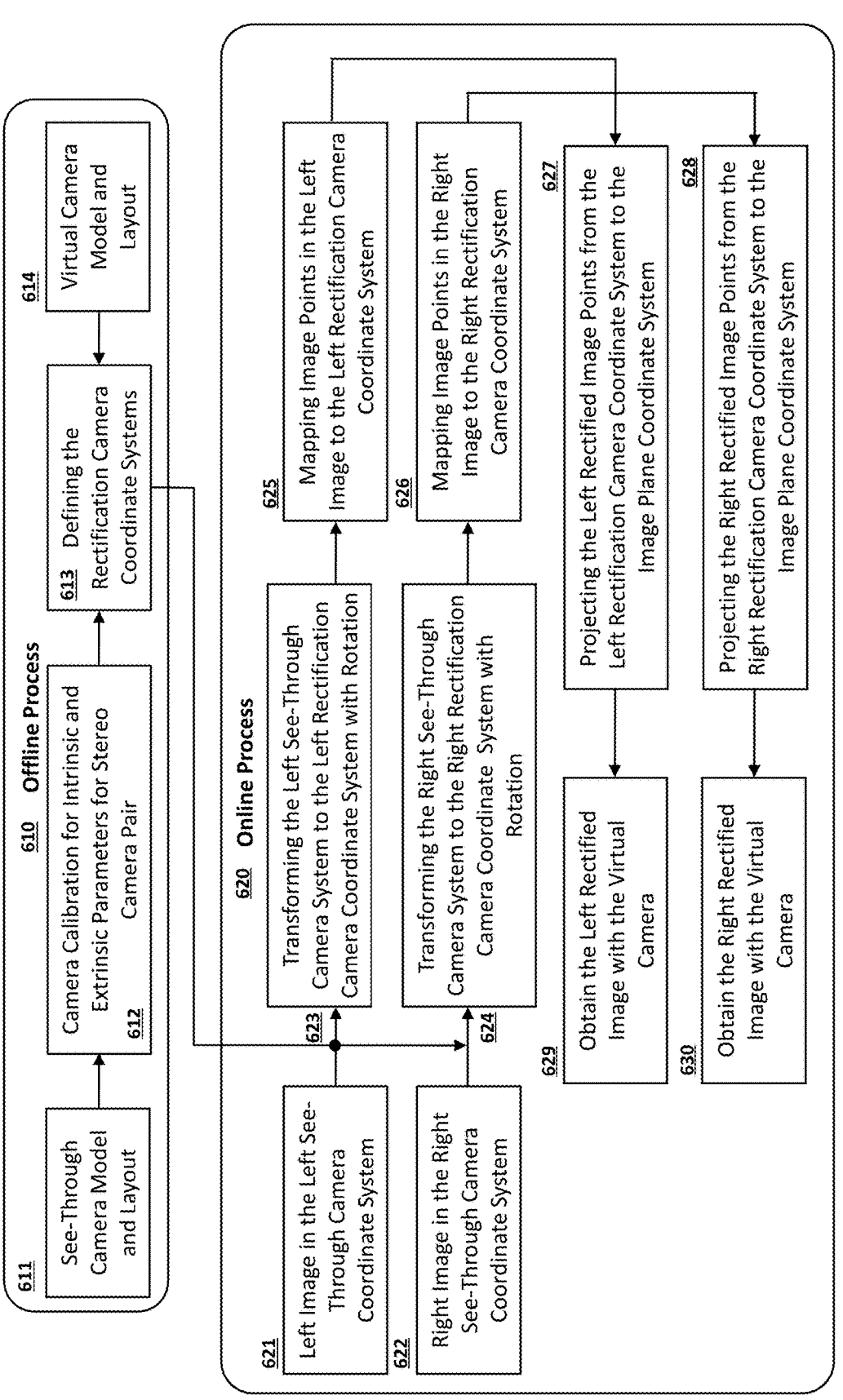
FIG. 6 illustrates an example model for image rectification.

FIG. 6 illustrates an example model for image rectification. As illustrated, the example model of FIG. 6 includes an offline process 610 and an online process 620.

Offline process 610 includes defining the rectification camera coordinate systems 613 with the see-through camera model 612, the camera calibration for intrinsic and extrinsic parameters for stereo camera pair 612, and the virtual camera model 614. In rectified camera coordinate systems, the left rectification camera coordinate system and the right rectification camera coordinate system are parallel. The defined rectification camera coordinate systems are then used in the online image rectification process 620.

Online process 620 includes coordinate system conversion and image point re-projection to rectify a captured image (or, in some embodiments, a mesh representing that image) from the see-through camera coordinate system to the rectification camera coordinate system.

The process of coordinate system conversion includes determining the rotation matrix between the see-through camera coordinate system and the rectification camera coordinate system defined by offline process 610 and rotating the see-through camera coordinate system to the rectification camera coordinate system 623. In addition, online process 620 includes rotating the left see-through image 621 from the left see-through camera coordinate system to the rectification camera coordinate system 623. The same process occurs for the right image 622 from the right see-through camera, as illustrated by element 624 of FIG. 6.

The process of image point re-projection includes mapping the image points in the rectification camera coordinate system from the rotated coordinates of the see-through camera coordinate system to the coordinates of the rectified image points in the rectification camera coordinate system. This occurs for the left image, as illustrated by element 625, and for the right image, as illustrated by element 626. The process including projecting the rectified image points from the rectification camera coordinate system to the image plane coordinate system to create the rectified image. This process occurs for the left image, as illustrated by element 627 and 629 of FIG. 6, and for the right image, as illustrated by elements 628 and 630 of FIG. 6.

After coordinate system conversion and the image point re-projection, particular embodiments can then rectify the images (or the mesh representing that image, as discussed herein) captured by the see-through camera in the see-through camera coordinate system to the rectification camera coordinate system. After projecting the rectified image points to the image plane coordinate system, particular embodiments then obtain the final rectified images to use in image transformations for the video see-through system, as explained more fully below.

In order to convert image points to the rectification camera coordinate system, transformation of the left image can be expressed as:

$$M_l = \begin{bmatrix} \cos\varphi \cdot \cos\theta & \cos\varphi \cdot \sin\theta & -\sin\varphi \\ -\sin\theta & \cos\theta & 0 \\ \sin\varphi \cdot \cos\theta & \sin\varphi \cdot \sin\theta & \cos\varphi \end{bmatrix} \quad (7)$$

where $\varphi$ is the rotation around the y axis and $\theta$ is the rotation around the z axis, as may be computed from the relative translation $T_r$ between the left and the right cameras.

The transformation of the right image can be expressed as $$M_r = M_l R_r \quad (8)$$

where $R_r$ is the relative rotation between the left and the right cameras.

Figure 7:
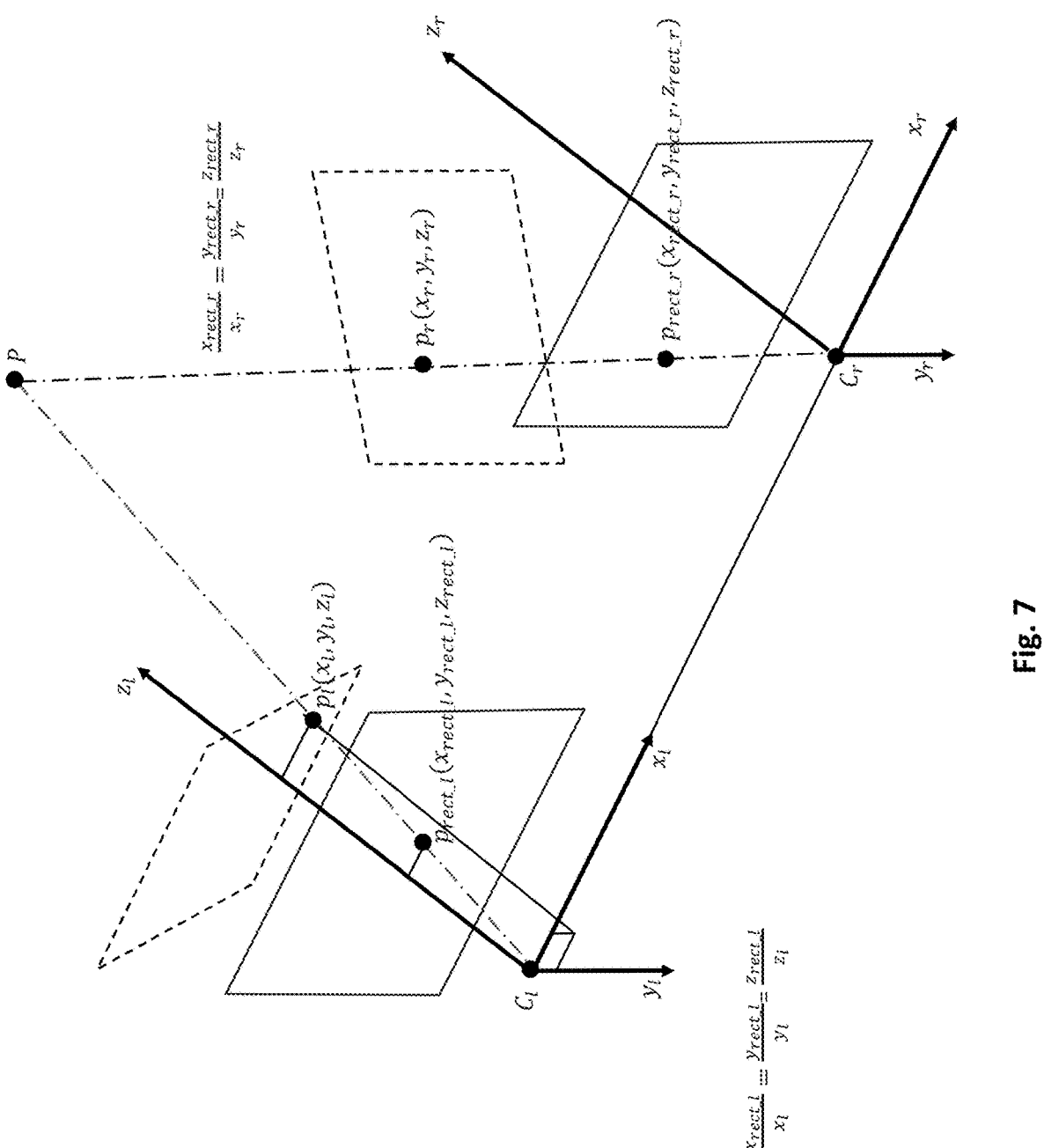
FIG. 7 illustrates an example mapping for image rectification.

In order to map image points to the rectification coordinate system, particular embodiments determine:

$$p_l(x_l, y_l, z_l) = M_l p_{ol}(x_{ol}, y_{ol}, z_{ol}) \quad (9)$$

where $p_{ol}$ is the image point in the original camera coordinate system $C_l(x_{ol}, y_{ol}, z_{ol})$ and $p_l(x_l, y_l, z_l)$ is the coordinate in the rectification camera coordinate system $C_l(x_l, y_l, z_l)$. Particular embodiments then map the image point $p_l(x_l, y_l, z_l)$ to $p_{rect\_l}(x_{rect\_l}, y_{rect\_l}, z_{rect\_l})$ in the rectification camera coordinate system, as shown in the example of FIG. 7, where:

$$p_{rect\_l}(x_{rect\_l}, y_{rect\_l}, z_{rect\_l}) = \Phi(p_l(x_l, y_l, z_l)) \quad (10)$$

Figure 8:
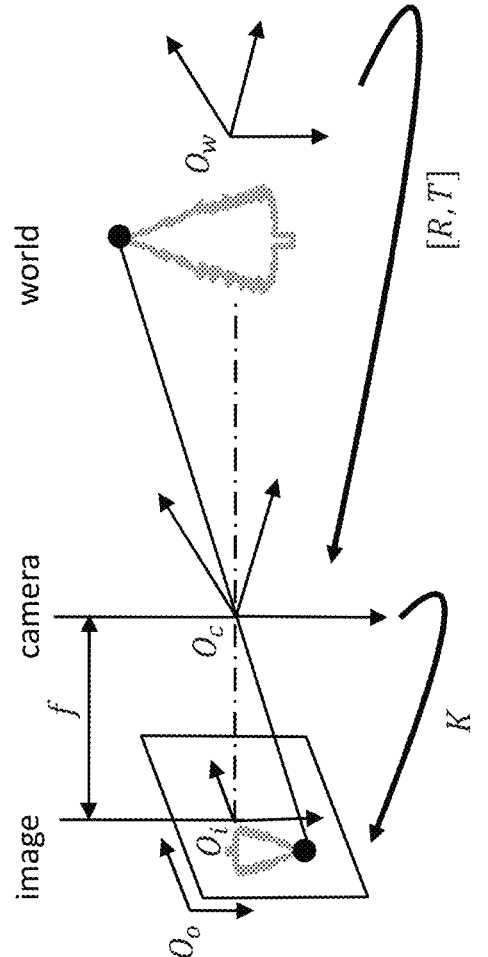
FIG. 8 illustrates an example projection for image rectification.

Particular embodiments then project $p_l(x_l, y_l, z_l)$ to the image plane of the rectification camera coordinate system, for example as shown in the example of FIG. 8, where:

$$p_l(u_l, v_l) = \mathcal{R}(p_{rect\_l}(x_{rect\_l}, y_{rect\_l}, z_{rect\_l})) \quad (11)$$

Similarly, the transformation for the right image may be computed as:

$$p_r = M_r P_{or} \quad (12)$$

Particular embodiments map the image point $p_r(x_r, y_r, z_r)$ to $p_{rect\_r}(x_{rect\_r}, y_{rect\_r}, z_{rect\_r})$ to the rectification camera coordinate system shown in FIG. 7:

$$p_{rect\_r}(x_{rect\_r}, y_{rect\_r}, z_{rect\_r}) = \Phi(p_r(x_r, y_r, z_r)) \quad (13)$$

and then project $p_r(x_r, y_r, z_r)$ to the image plane of the rectification camera coordinate system shown in FIG. 8:

$$p_r(u_r, v_r) = \mathcal{R}(p_{rect\_r}(x_{rect\_r}, y_{rect\_r}, z_{rect\_r})) \quad (14)$$

In particular embodiments, step 210 of the example method of FIG. 2 includes transforming 318 the image frame from that of the video see-through camera to that of the virtual camera, for example by transforming a rectified mesh representing the image using one or more of a model 315 of a virtual camera corresponding to the image and a model 316 for transforming the view from the see-through camera to the virtual camera. Transformation may be represented as:

$$(x_m, y_m) \leq \mathcal{M}(x_r, y_r) \quad (15)$$

Where $(x_r, y_r)$ is the coordinate of the rectified image and $(x_m, y_m)$ is the coordinate of the viewpoint matched image.

Figure 9:
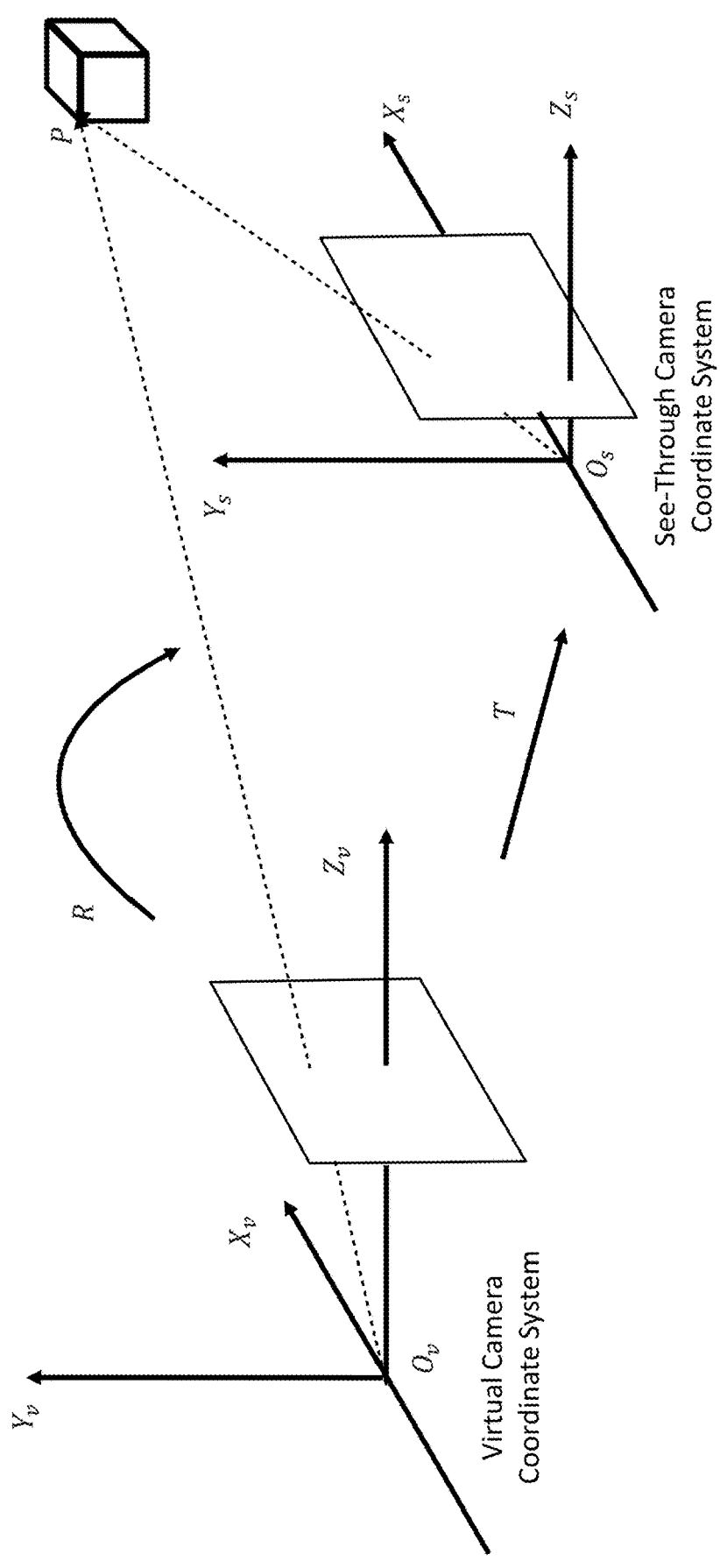
FIG. 9 illustrates an example model for transforming an image frame from the see-through camera to the virtual camera.

FIG. 9 illustrates an example model for transforming an image frame from the see-through camera to the virtual camera with camera viewpoint matching. In this example, $O_v(X_v, Y_v, Z_v)$ is the virtual camera coordinate system and $O_x(X_s, Y_s, Z_s)$ is the see-through camera coordinate system, and there may be both a rotation R and a translation T between these two coordinate systems. The coordinates of the virtual image are:

$$P_v = R(P_s - O_v) \quad (16)$$

where, $P_v$ is the coordinate of the virtual image, R is rotation matrix between the virtual camera and the see-through camera, $P_s$ is the coordinate of the see-through image, and $O_v$ is the coordinate of the virtual camera. The coordinate of the virtual image is:

$$P_v = \begin{pmatrix} x_v \\ y_v \\ z_v \\ 1 \end{pmatrix} \quad (17)$$

And the coordinate of the see-through camera image is:

$$P_s = \begin{pmatrix} x_s \\ y_s \\ z_s \\ 1 \end{pmatrix} \quad (18)$$

Equation 16 may be re-written as:

$$\begin{pmatrix} x_v \\ y_v \\ z_v \\ 1 \end{pmatrix} = \begin{bmatrix} R & -RO_v \\ 0 & 1 \end{bmatrix} \begin{pmatrix} x_s \\ y_s \\ z_s \\ 1 \end{pmatrix} \quad (19)$$

Translation may be represented as:

$$T = -RO_v \quad (20)$$

And therefore equation 19 may be expressed as:

$$\begin{pmatrix} x_v \\ y_v \\ z_v \\ 1 \end{pmatrix} = \begin{bmatrix} R & T \\ 0 & 1 \end{bmatrix} \begin{pmatrix} x_s \\ y_s \\ z_s \\ 1 \end{pmatrix} \tag{21}$$

Figure 10:
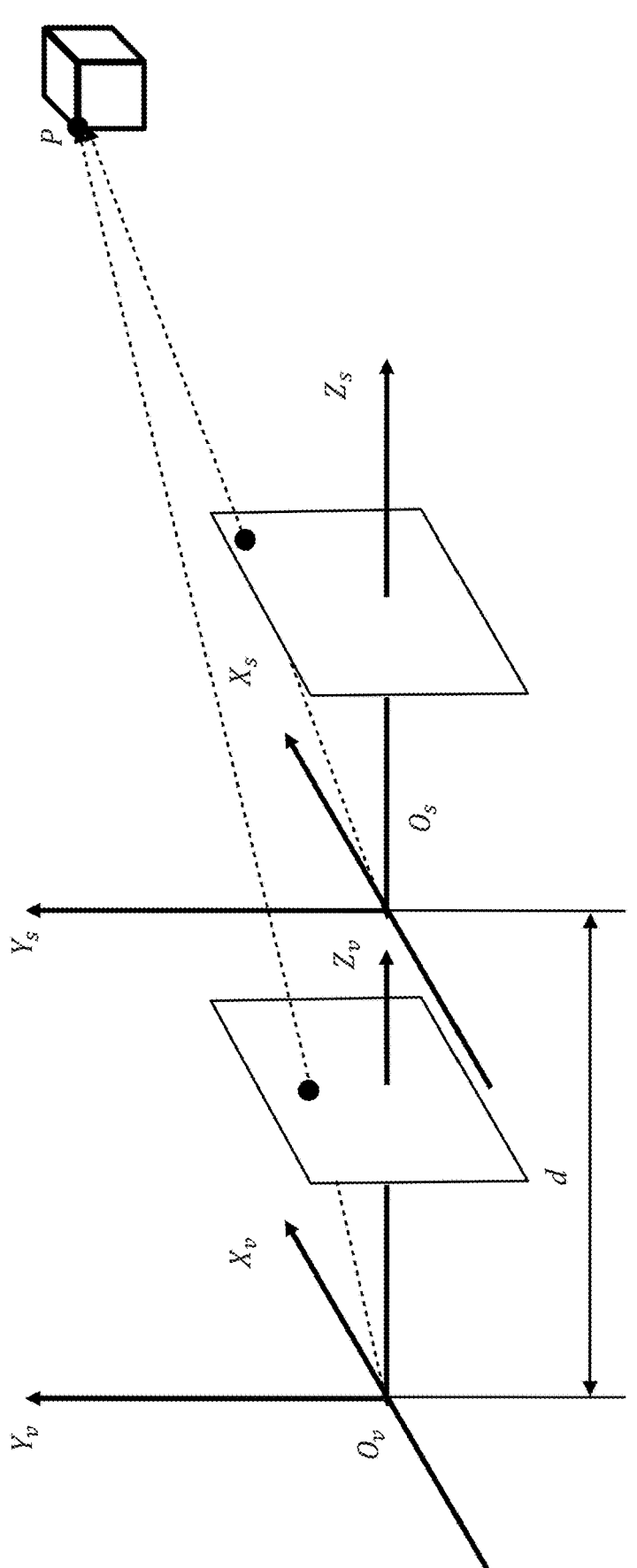
FIG. 10 illustrates an example transformation in which there is a translation.

FIG. 10 illustrates an example in which there is a translation in the z direction only. In this example, because there is no rotation between these two coordinate systems, then R=1 and the translation is:

$$T = \begin{pmatrix} t_x \\ t_y \\ t_z \end{pmatrix} \tag{22}$$

where $t_x=0$, $t_y=0$, and $t_z=d$ in this example. Using equation (21) with the results of this example:

$$\begin{pmatrix} x_v \\ y_v \\ z_v \\ w_v \end{pmatrix} = \begin{bmatrix} I & T \\ 0 & 1 \end{bmatrix} \begin{pmatrix} x_s \\ y_s \\ z_s \\ w_s \end{pmatrix} = \begin{bmatrix} 1 & 0 & 0 & 0 \\ 0 & 1 & 0 & 0 \\ 0 & 0 & 1 & d \\ 0 & 0 & 0 & 1 \end{bmatrix} \begin{pmatrix} x_s \\ y_s \\ z_s \\ w_s \end{pmatrix} \tag{23}$$

And therefore:

$$\begin{pmatrix} x_v \\ y_v \\ z_v \\ w_v \end{pmatrix} = \begin{pmatrix} x_s \\ y_s \\ z_s + d \\ w_s \end{pmatrix} \tag{24}$$

The 3D coordinates can be warped to the display screen coordinates:

$$\begin{pmatrix} x_{vsc} \\ y_{vsc} \end{pmatrix} = \begin{pmatrix} w \dfrac{\frac{x_v}{w_v} + 1}{2} \\ h \dfrac{\frac{y_v}{w_v} + 1}{2} \end{pmatrix} \tag{25}$$

where w is the image width and h is the image height. Then, particular embodiments may use the virtual image coordinates in pre-warping to obtain pre-distorted images for display lens geometric distortion and chromatic aberration correction, as explained below.

Figure 11:
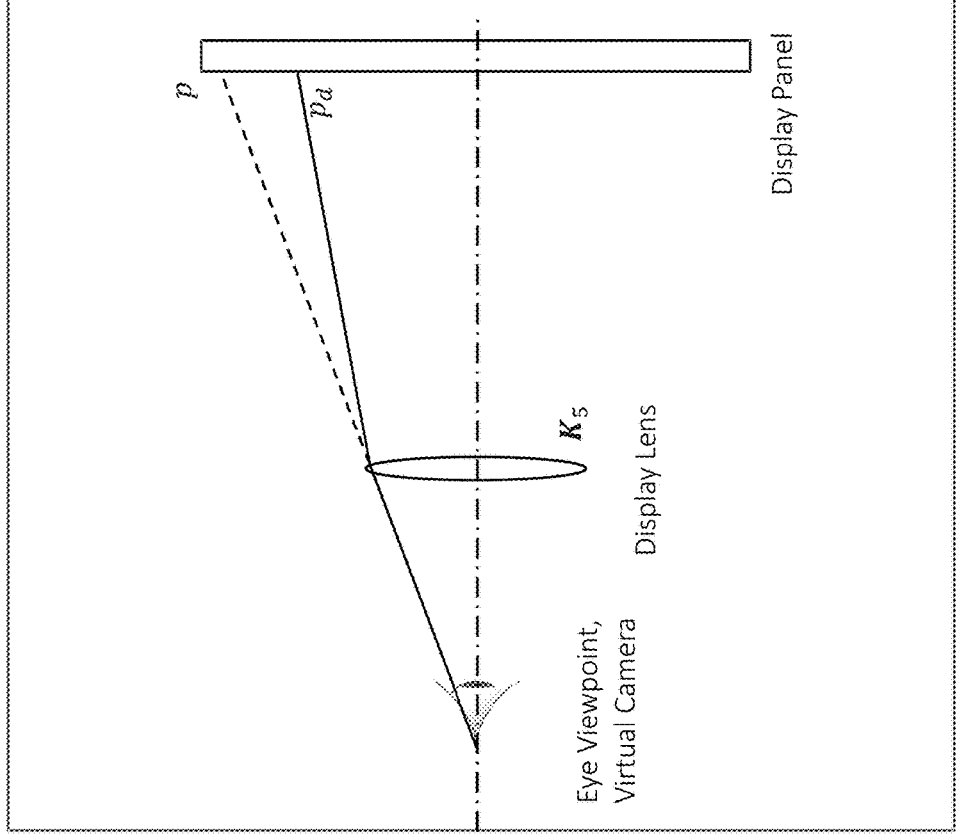
FIG. 11 illustrates an example model of a display lens.

In particular embodiments, step 210 of the example method of FIG. 2 includes correcting 320 distortions in the image introduced by the display lens, for example by using a model 321 of the display lens. FIG. 11 illustrates an example model for the display lens. A display lens can provide a large field-of-view scene on a display panel that is close to a user's eye, and a display lens can be useful in a head-mounted display, for example. However, the display lens creates geometric distortions and chromatic aberrations.

As shown in FIG. 11, a ray traced from the eye to the panel will reach point p on the panel if there is no lens between the eye, but will reach point $p_d$ on the panel if there is a lens between the eye and the panel. The difference between point p and point $p_d$ is due to geometric distortion caused by the display lens. The display lens will create different geometric distortions in different color channels, which are referred to as chromatic aberrations.

A radial distortion model for the display lens may be represented as:

$$\begin{cases} (x_{5d} - x_{5c}) = (x_m - x_{5c})(1 + k_{51}r_5^2 + k_{52}r_5^4 + k_{53}r_5^6) \\ (y_{5d} - y_{5c}) = (y_m - y_{5c})(1 + k_{51}r_5^4 + k_{52}r_5^4 + k_{53}r_5^6) \end{cases} \tag{26}$$

where $(x_{5c}, y_{5c})$ are the coordinates of the distortion center, $(x_{5d}, y_{5d})$ are the coordinates in the distorted image, $(x_m, y_m)$ are the pixel coordinates in the undistorted image, and $(k_{51}, k_{52}, k_{53})$ are the distortion coefficients of the display lens, which can be obtained by display lens calibration.

Figure 12:
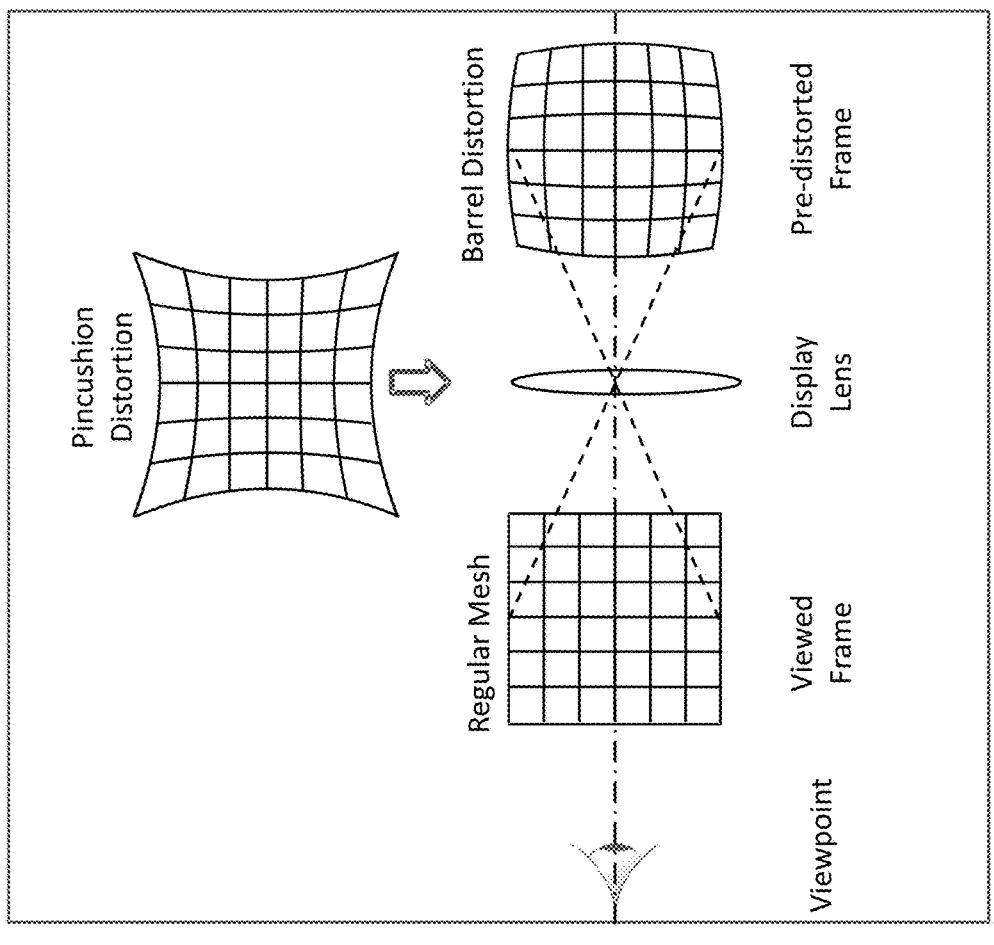
FIG. 12 illustrates an example procedure for correcting the distortion caused by a display lens.

FIG. 12 illustrates an example procedure for correcting the distortion caused by a display lens. In the example of FIG. 12, the display lens creates a pincushion distortion. In order to correct the distortion, e.g. as illustrated by the regular mesh shown in the figure, particular embodiments create a mesh with barrel distortion to display on the display panel. The barrel distortion is an inverse of the pincushion distortion of the display lens, and therefore rays from the displayed barrel-distorted image are distorted such that the image with barrel distortion appears as an undistorted image.

In order to correct chromatic aberrations, particular embodiments pre-distort separate meshes in separate color channels. For example, a mesh in the red channel may be distorted with the coefficients of the red channel, a mesh in the green channel may be distorted with the coefficients of the green channel, and a mesh in the blue channel may be distorted with the coefficients of the blue channel. In this way, particular embodiments compensate the lateral chromatic aberrations caused by the different geometric distortions associated with different wavelengths. Taking the steps together, the coordinates of the undistorted image are:

$$\begin{cases} x_m = x_{vsc} \\ y_m = y_{vsc} \end{cases} \tag{27}$$

where $(x_{vsc}, y_{vsc})$ are the display screen coordinates of the virtual image.

While the above model of the display lens uses a radial distortion for geometric distortion and chromatic aberration, particular embodiments may calibrate the display lens and store the geometric distortion and the chromatic aberration to look-up tables. Such embodiments can then use the lookup tables directly for creating pre-distorted image for compensating the geometric distortion and the chromatic aberration in different color channels. One benefit of using lookup tables is that lookup tables can store any kinds of distortions such as symmetric distortion (radial distortion), asymmetric distortion (tangential distortion), etc. On the other hand, in some embodiments a lookup table may be too large for large fields of view and for high-resolution virtual views. In contrast, a model that uses polynomial equations only requires several parameters to define the model, e.g., for use by third-party developers.

Figure 13:
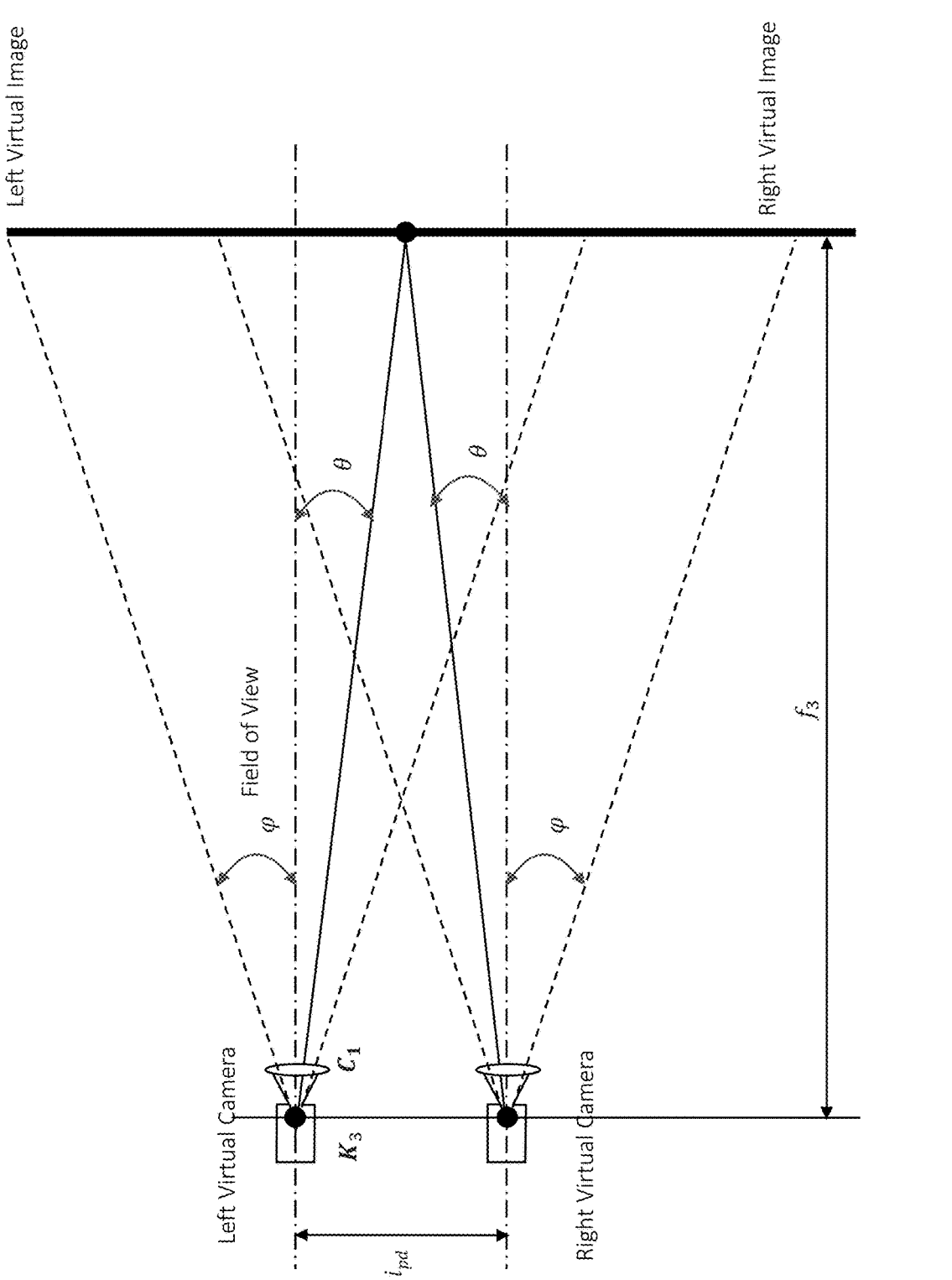
FIG. 13 illustrates an example model of a virtual camera.

In particular embodiments, step 210 of the example method of FIG. 2 includes using a model of a virtual camera to transform the mesh, for example in order to transform the image from the perspective of the see-through camera to the perspective of the virtual camera. FIG. 13 illustrates an example model for the virtual camera. In order to render the virtual image corresponding to the real-world environment, this example creates a pinhole model camera matrix $K_3$ and a polynomial distortion model $C_3$ for the virtual camera:

$$K_3 = \begin{bmatrix} f_{3x} & s_3 & c_{3x} \\ 0 & f_{3y} & c_{3y} \\ 0 & 0 & 1 \end{bmatrix} \qquad (28)$$

where $(f_{3x}, f_{3y})$ are focal lengths, $(c_{3x}, c_{3y})$ are optical centers, and $s_3$ is a skew coefficient, and:

$$\begin{cases} x_{3d} = x_3\left(1 + k_{31}r_3^2 + k_{32}r_3^4 + k_{33}r_3^6\right) + \left[2p_{31}x_3y_3 + p_{32}\left(r_3^2 + 2x_3^2\right)\right] \\ y_{3d} = y_3\left(1 + k_{31}r_3^2 + k_{32}r_3^4 + k_{33}r_3^6\right) + \left[p_{31}\left(r_3^2 + 2y_3^2\right) + 2p_{32}x_3y_3\right] \end{cases} \qquad (29)$$

where $(x_{3d}, y_{3d})$ are distorted coordinates, $(x_3, y_3)$ re undistorted coordinates, $(k_{31}, k_{32}, k_{33})$ are radial distortion coefficients, $$r_3^2 = x_3^2 + y_3^2,$$

and $(p_{31}, p_{32})$ are tangential distortion coefficients.

The distortion model can the be expressed as:

$$C_3 = (k_{31}\ k_{32}\ p_{31}\ p_{32}\ k_{33}) \qquad (30)$$

Therefore, the computational model of the virtual camera model is $(K_3, C_3)$. The parameters of the camera matrix and the coefficients of the distortion model are determined by virtual camera calibration. As shown in FIG. 13, for the stereo virtual camera pair, other additional parameters are needed such as interpupillary distance (ipd) and field of view ($2\varphi$). In addition, when a virtual 3D object is located at the same distance as the virtual image plane, particular embodiments can calculate the rotation angles of the left and right eyes as $$\theta = \sin^{-1}\left(\frac{ipd}{2f_3}\right) \qquad (31)$$

where $\theta$ is the angle which the left eye and right eye needs to rotate to see the 3D virtual object at the same distance of the virtual image plane, ipd is the interpupillary distance of the eyes, and $f_3$ is the focal length of the virtual camera, where:

$$f_3 = \sqrt{f_{3x}^2 + f_{3y}^2} \qquad (32)$$

and $(f_{3x}, f_{3y})$ are focal lengths in the x and y dimensions, respectively.

Step 215 of the example method of FIG. 2 includes generating, based on the modification to the image, a transformation map for the camera that captured the accessed image, where the transformation map identifies frame-independent transformations to apply for rendering a scene based on one or more subsequent images captured by that camera. For example, in FIG. 3 transformation map 319 identifies frame-independent transformations to apply for rendering a scene based on one or more subsequent images captured by the respective cameras.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, such as the computer system of FIG. 26, this disclosure contemplates any suitable combination of any suitable components, devices, or systems carrying out any suitable steps of the method of FIG. 2. Moreover, this disclosure contemplates that some or all of the computing operations described herein, including the steps of the example method illustrated in FIG. 2, may be performed by circuitry of a computing device, for example the computing device of FIG. 26, by a processor coupled to non-transitory computer readable storage media, or any suitable combination thereof.

Figure 14:
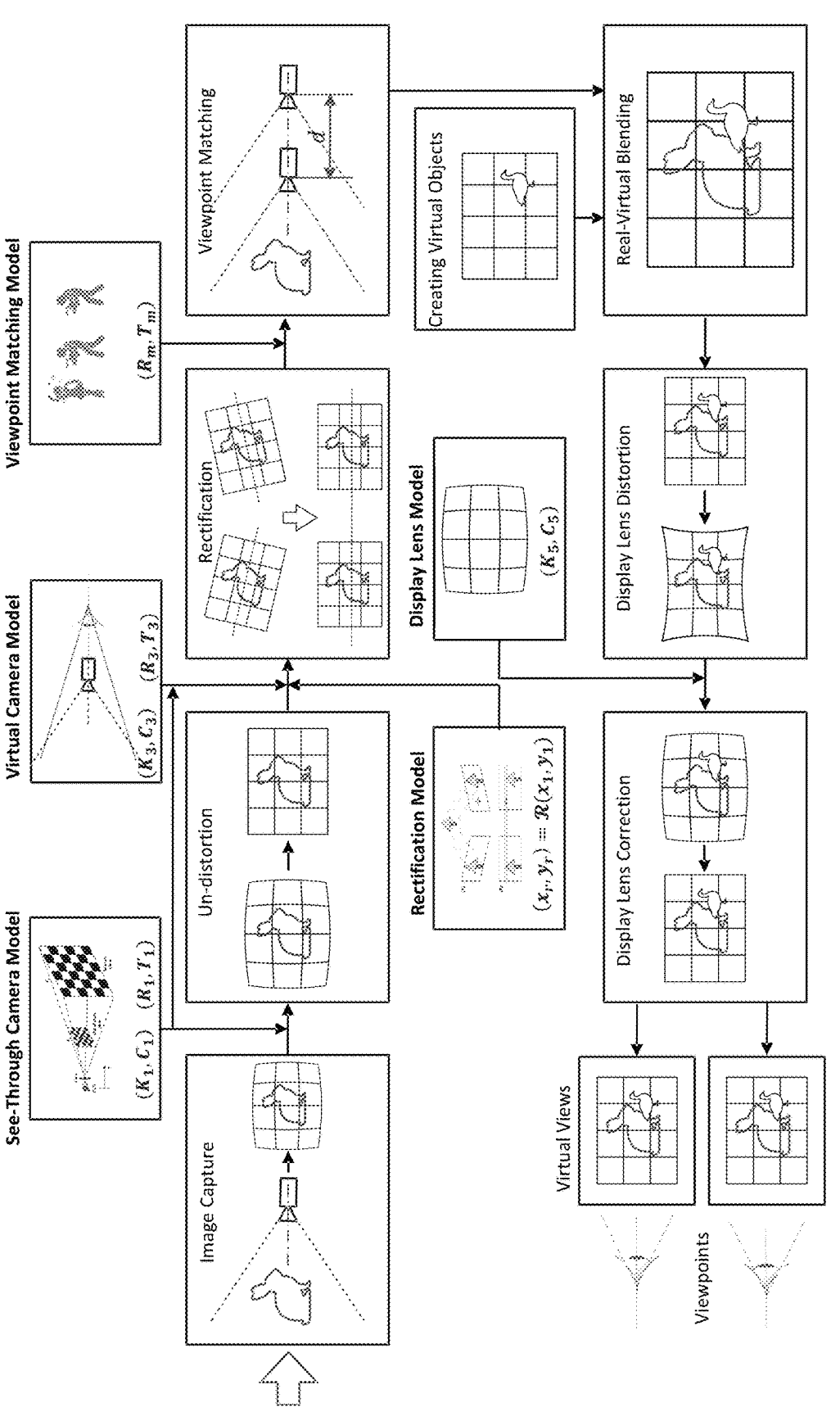
FIG. 14 illustrates an example set of transformations.

FIG. 14 illustrates an example set of transformations that track those discussed above, for example with respect to the example set of FIG. 3. In the example of FIG. 14, a real object (i.e., a bunny) is captured by each camera of a stereoscopic camera pair (although for convenience, only one capturing camera is shown in the figure). For a mesh for each image of the left and right stereoscopic pair, the mesh is undistorted, rectified, and viewpoint matching is performed to transform the perspective from that of the camera to that of the virtual camera, which is offset from the capturing camera by a distance d. As illustrated in the example of FIG. 3, during rendering a virtual object is created and blended with the image of the real scene, display-lens distortion (e.g., a pincushion distortion) is corrected, and then corrected, blended images are displayed.

After a transformation map is obtained for a particular system, then that transformation map may be used to correct images captured by the system for display to a user. As explained above, doing so avoids having to compute transformations and corrections for each captured image on-the-fly during image rendering, and therefore reduces latency during the rendering process. For example, rendering process 330 illustrates an example use of a transformation map generated previously for a particular system. For each image captured by a camera of the system, the image 331 is distorted by the system components, as discussed above. As illustrated in element 332 of the example of FIG. 3, the transformation map is accessed and used to determine the appropriate un-distortion, rectification, and viewpoint matching for the image. In addition, as illustrated in the example of FIG. 3, the corrections 335 determined by the display lens model discussed above may be used to pre-distort the captured image for display, such that when the pre-distorted image passes through a display lens, then the captured image appears undistorted. As illustrated in the example of FIG. 3, one or more virtual objects 334 may be generated during rendering, e.g., by a GPU, and the blended real-and-virtual image may be pre-distorted according to the corrections 335. Finally, correct, blended image is rendered 333 on a display for viewing by a user. In particular embodiments, corrections 335 may be stored with, and may be part of, transformation map 319.

Figure 19:
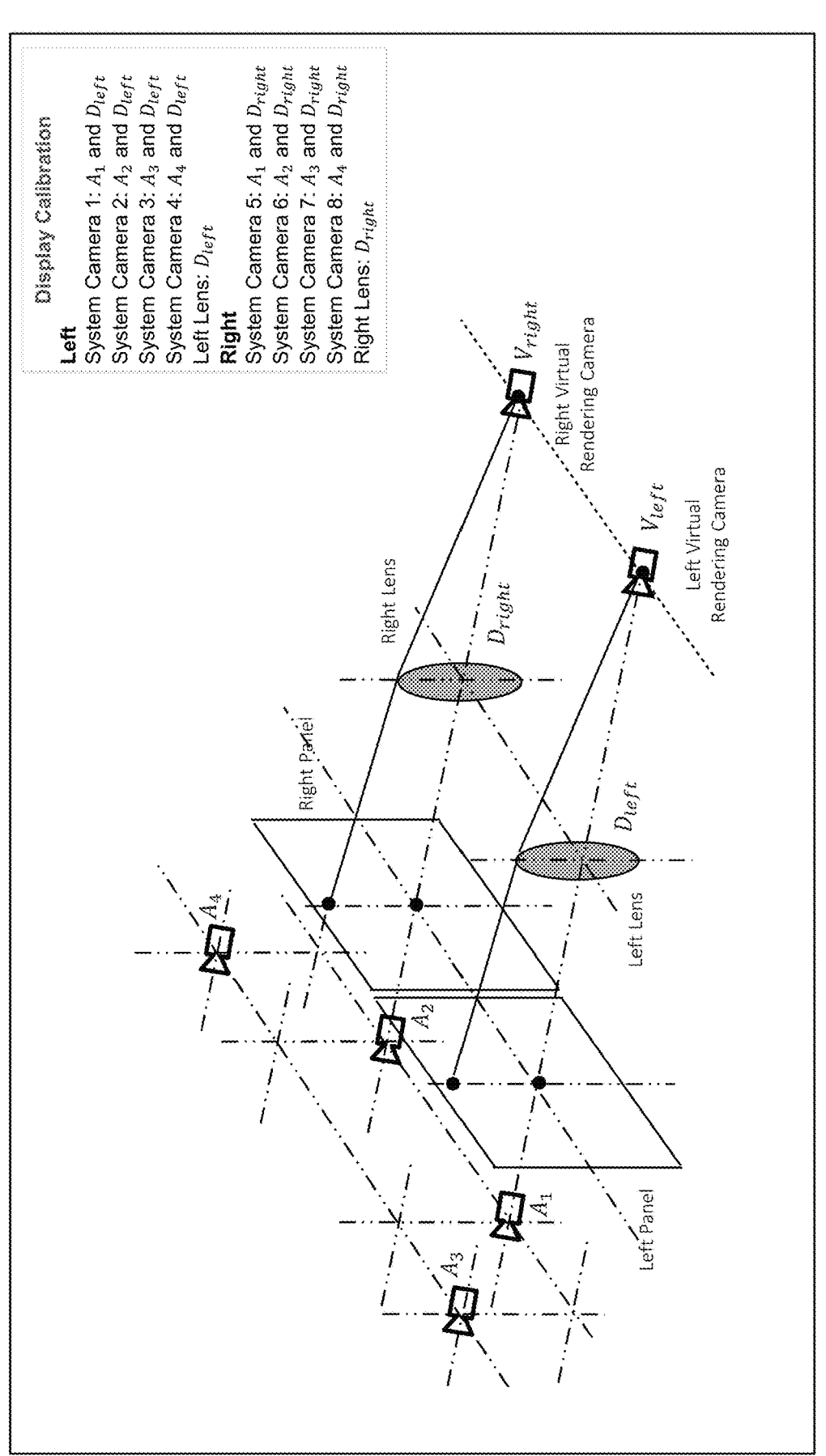
FIG. 19 illustrates an example system that includes 4 cameras for capturing real-world content.

Particular embodiments use a model of the video transformation in video see-through AR with two see-through cameras, including the left and right cameras. In particular embodiments, a system may include more than two see-through cameras, such as illustrated in FIG. 19, and a model may be used for each of these multiple see-through cameras, which may be different types of cameras with different lens parameters. Such embodiments model each camera according to its camera and lens types and then determine the contribution of each see-through camera to the virtual cameras. In particular embodiments, a single see-through camera may be used (with the see-through camera and left display lens creating a left "camera" and the see-through camera and right display lens creating a right "camera," as described more fully in connection with FIG. 19), and this single camera may be rectified with the left virtual camera and the right virtual camera, respectively, and the contribution of the see-through camera to the left and right virtual cameras respectively is determined.

As discussed above, components of a video see-through AR system may introduce distortions and other transformations to content captured by the system and to content viewed by a user. For example, a light ray from a scene in the environment of the system must pass through a see-through camera lens and a display lens before being viewed by a user, and each of these lenses modifies the light ray, such as by introducing geometric distortions and/or chromatic aberrations. Calibrating a display lens and the combination of the display lens and the corresponding see-through camera lens for a system can reduce these distortions and improve the content viewed by a user. As discussed herein, this calibration may be specific to a particular instance of a device, for example because each instance may have slight differences due to variances during manufacturing of or installation of device components, and therefore each calibration is performed specifically for a particular instance of device and identifies parameters specific to that device. Moreover, the calibration techniques discussed herein can provide device parameters that can be used to make further corrections to content captured by and displayed by a system, for example as used by the example processes of FIG. 3.

Figure 16:
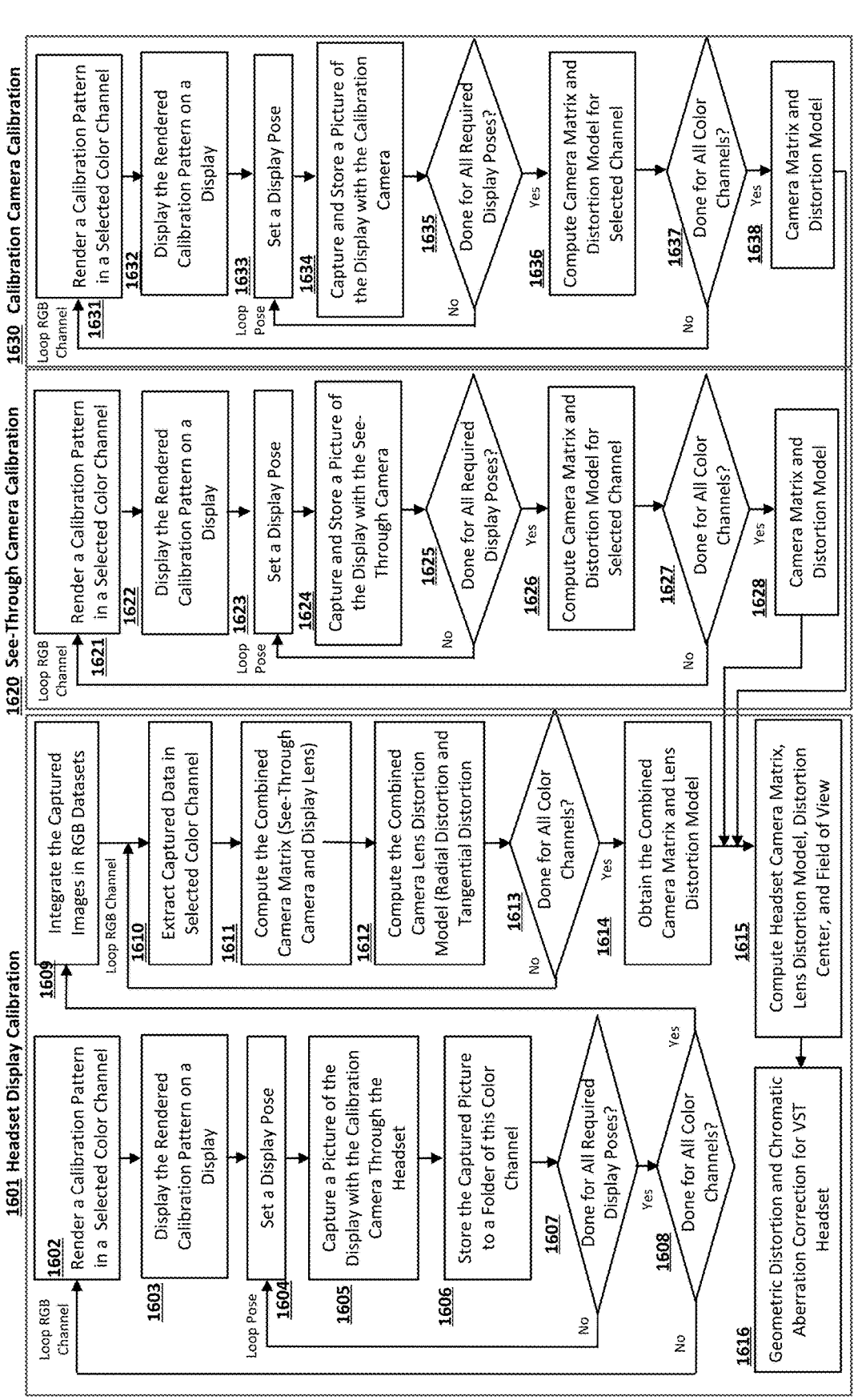
FIG. 16 illustrates an example process implementing the example method of FIG. 15.

FIG. 15 illustrates an example method for calibrating a video see-through AR system. FIG. 16 illustrates an example process implementing the example method of FIG. 15, and FIG. 17 illustrates an example architecture for performing the example process of FIG. 16 and the example method of FIG. 15.

Step 1505 of the example method of FIG. 15 includes capturing, by a calibration camera, a calibration pattern displayed on a display of a video see-through AR system. For example, the calibration camera may be calibration camera 1702 of the example architecture shown in FIG. 17. As illustrated in FIG. 17, calibration camera 1702 is located at an eye position for viewing content on the video see-through AR system, i.e., located at the location a user's eye should be when a user is viewing content displayed by display panel 1705 of the system (also known as the "eye relief," which may be, e.g., 12 mm in particular embodiments). In particular embodiments, and in the example of FIG. 17, the video see-through AR system is a headset 1701 that includes one or more see-through cameras 1706 (e.g., a pair of stereoscopic cameras) that each have a camera lens 1707. In the example of FIG. 17, headset 1701 includes a display panel 1705 that has a left display and a right display for displaying real-world content captured by a see-through camera and for displaying any virtual content generated for display. A user views content displayed on display panel 1705 through one or more display lenses 1704 (e.g., a left display lens for the user's left eye and a right display lens for the user's right eye).

Figure 17:
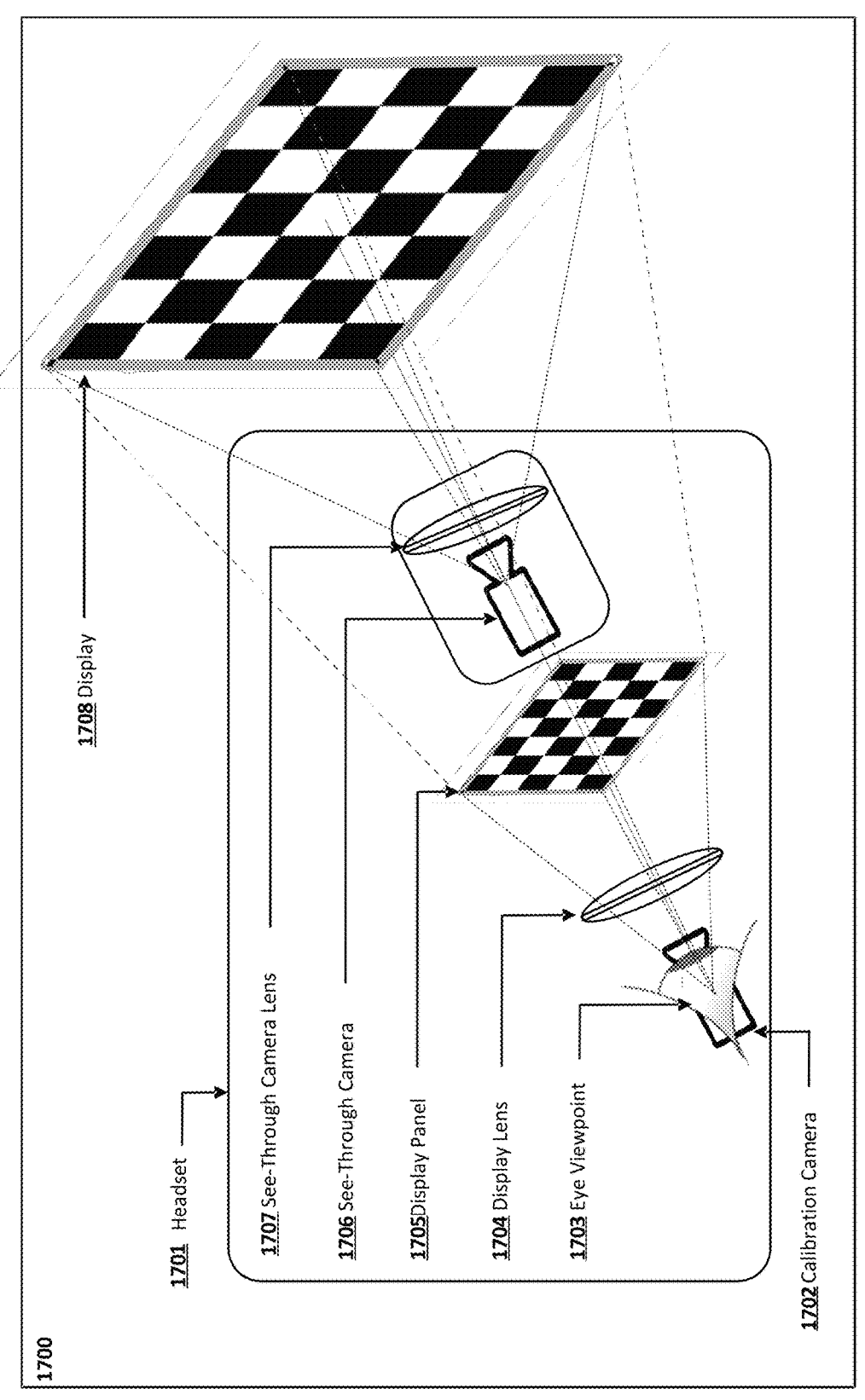
FIG. 17 illustrates an example architecture for performing the example process of FIG. 16 and the example method of FIG. 15.

In particular embodiments, the displayed calibration pattern shown on a display panel, such as the calibration pattern illustrated on display panel 1705 of the example of FIG. 17, corresponds to an image of a calibration pattern captured by a see-through camera of the video see-through AR system. For example, FIG. 17 illustrates a display pattern displayed on external display 170. The external display may be any suitable display, such as a TV screen, a monitor, etc. The calibration pattern may be a predetermined pattern having known display characteristics, such as known geometric patterns and/or known color profiles. For example, a calibration pattern may be a checkerboard-type pattern of various colors. In particular embodiments, calibration may be based on more than one calibration image. For example, the location, position, and/or orientation of calibration patterns can be changed during a calibration process.

Step 1510 of the example method of FIG. 15 includes determining, based on the captured calibration pattern, one or more system parameters of the video see-through AR system that represent combined distortion caused by a display lens of the video see-through AR system and caused by a camera lens of the see-through camera. FIG. 16 illustrates an example of this step in the context of the example architecture of FIG. 17. The example process of FIG. 16 includes three main portions: a headset display calibration 1601 which is used to determine distortions (e.g., geometric distortions and chromatic aberrations) introduced by one set (e.g., right or left) of headset components as a whole; see-through camera calibration 1620, which is used to determine distortions (e.g., geometric distortions and chromatic aberrations) introduced by the see-through camera; and calibration camera calibration 1630 which is used to determine distortions (e.g., geometric distortions and chromatic aberrations) introduced by the calibration camera. While the calibration camera is not part of the video see-through AR system itself, that camera will introduce its own distortions to images it captures, and these distortions must be corrected in order to determine the distortions introduced by the actual components of the video see-through AR system.

As illustrated in the example of FIG. 17, a calibration process may be performed for each color channel in a plurality of channels (e.g., each of the three channels in an RGB color representation). The example of FIG. 17 includes rendering a calibration pattern in a selected color channel 1602 and then displaying the rendered calibration pattern on the TV display 1603. The video see-through AR system (in this example, a headset) is placed in a fixed position (e.g., on a table) and a calibration camera is placed behind the system such that it is viewing the entire calibration pattern displayed on the display of the headset, which is displaying the entire calibration pattern captured by the headset. The display (e.g., a TV) is set in a particular pose (position and orientation) in step 1604, and the calibration camera captures a picture of the calibration pattern through the system, i.e., as displayed on the system display, in step 1605. In step 1606 the picture captured by the calibration camera is stored in a particular location, such as a folder, associated with the color channel in step 1602. Steps 1604 to 1607 are repeated for each of a number of display poses. For example, a user may be instructed to rotate the display (e.g., the TV) by a particular amount or range, such as 1 degree, 2 degrees, etc. When all the applicable poses have been captured for a particular color channel, then steps 1602 to 1607 are repeated for a different color channel, until all color channels have been captured, as illustrated by step 1608.

Step 1609 of the example method of FIG. 17 includes integrating the captured pictures into RGB datasets, which are subsequently used to determine camera parameters and distortion models. In the example of FIG. 17, process 1601 treats the headset as a camera with a display lens and having a viewpoint at the eye viewpoint. Step 1610 includes extracting captured data in a selected color channel.

Steps 1611 and 1612 include determining system parameters representing the distortion of the combined system camera, which here treats the see-through camera and lens (e.g., elements 1706 and 1707 in FIG. 1) and the display lens (e.g., element 1704 in FIG. 17) along with the calibration camera and lens as elements of a single camera, given that a user viewing content on display 1705 of headset 1701 will see content that has been modified by both components. For example, step 1611 includes determining the combined camera matrix, which includes contributions from the see-through camera and the display lens of the system, and also includes contributions from the calibration camera that will be removed after process 1630, as described below. The camera matrix (which also may be referred to as part of "camera intrinsics") may be represented as:

$$K = \begin{bmatrix} f_x & s & c_x \\ 0 & f_y & c_y \\ 0 & 0 & 1 \end{bmatrix} \tag{33}$$

where $(f_x, f_y)$ are the focal lengths for the camera, $(c_x, c_y)$ are the optical centers, and s is a skew coefficient. Thus, step 1611 of the example method of FIG. 16 includes determining this matrix for the combined system components mentioned above (e.g., $(f_x, f_y)$ in this step are the focal lengths of the combined system components, $(c_x, c_y)$ are the optical centers of those components, etc.).

Step 1612 includes determining a distortion model for the camera-lens components. The distortion model includes radial distortion and tangential distortion. For example, radial distortion may be represented as:

$$\begin{cases} x_d = x\left(1 + k_1 r^2 + k_2 r^4 + k_3 r^6\right) \\ y_d = y\left(1 + k_1 r^2 + k_2 r^4 + k_3 r^6\right) \end{cases} \tag{34}$$

where $(x_d, y_d)$ are distorted coordinates, $(x, y)$ are undistorted coordinates, $(k_1, k_2, k_3)$ are radial distortion coefficients, and $r^2 = x^2 + y^2$. Tangential distortion can be represented as:

$$\begin{cases} x_d = x + \left[2p_1 xy + p_2(r^2 + 2x^2)\right] \\ y_d = y + \left[p_1(r^2 + 2y^2) + 2p_2 xy\right] \end{cases} \tag{35}$$

where $(x_d, y_d)$ are distorted coordinates, $(x, y)$ are undistorted coordinates, and $(p_1, p_2)$ are tangential distortion coefficients.

A distortion model can be made using a distortion coefficient $C = (k_1\ k_2\ p_1\ p_2\ k_3)$. Display calibration is used for determining the camera matrix K and the distortion model C for each camera (i.e., for the see-through camera, for the calibration camera, for the "camera" representing the display lens, and for the "camera" representing the headset, i.e., the combination of the see-through camera with lens and the display lens). For example, calibration process 1601 of the example of FIG. 16 determines K and C for the combined camera.

Step 1613 of the example method of FIG. 16 determines whether steps 1610 to 1612 have been performed for all color channels. If yes, then the results are combined in step 1614 to obtain the combined camera matrices and distortion models for all color channels. These results can then be combined with the results of procedures 1620 and 1630, as discussed below. Process 1601 may be performed for each camera-lens combination of a system, for example as described more fully in connection with FIG. 19, below.

In order to fully calibrate the headset and determine the parameters necessary to correct distortion caused by the system, the example of FIG. 16 obtains parameters, such as camera matrices and distortion models, for the see-through camera and the calibration camera. Process 1620 calibrates the see-through camera while process 1630 calibrates the calibration camera, and in the example of FIG. 16, these two processes are similar.

Procedure 1620 for calibrating a see-through camera includes step 1621, which includes rendering a calibration pattern in a selected color channel. Step 1622 includes displaying the rendered calibration pattern on a display, such as on a TV. A pose for the display is set in step 1623, and then in step 1624 the see-through camera captures and stores a picture of the display having a particular pose. Note that in this calibration step, it is the see-through camera that is capturing the original display of the pattern, in contrast to procedure 1601, in which the calibration camera captures the display of the pattern on the display of a headset.

Step 1625 is the decision that determines whether steps 1623 to 1625 have been completed for all the required display poses. Step 1626 includes determining parameters that represent distortion caused by the see-through camera, for example by determining a camera matrix for the see-through model and a distortion model for that camera, all in the selected color channel, using equations 33-35 and the distortion model C for the see-through camera. Step 1627 determines whether steps 1621-1626 have been performed for all color channels, and if so, then step 1628 includes creating the full camera matrix and distortion model for the see-through camera, based on the full set of color channels.

Procedure 1630 is similar to procedure 1620, except that in procedure 1630 the calibration camera is capturing the calibration pattern shown on the display (e.g., the TV), and the process provides parameters representing the distortion created by the calibration camera, e.g., a camera matrix and distortion model for that camera. Then, using the results of procedure 1630, the contributions of the calibration camera can be removed from step 1614, using the parameters representing the distortion created by the calibration camera, to determine the distortion caused by the system's actual components (e.g., the see-through camera and display lens).

After processes 1601, 1620, and 1630 are completed, then the resulting information can be used in step 1615 to determine, for each side: (1) the headset camera matrix, which represents the combined effects of the display lens and the see-through camera and lens without the contribution from the calibration camera that was removed after process 1630 from the combined camera parameters obtained in step 1614; (2) a distortion model for the display lens; (3) the distortion centers; and (4) the field of view. This illustrates a specific example of step 1515 of the example method of FIG. 15, which includes determining, based on the one or more system parameters and on one or more camera parameters that represent distortion caused by the see-through camera, one or more display-lens parameters that represent distortion caused by the display lens. For instance, the relationship of distortions between the see-through camera, the display lens, and the headset is:

$$D_2 = D_3^{-1} D_h D_3^{-1} \qquad (36)$$

where $D_2$ is distortion of the display lens, $D_h$ is distortion of the headset, and $D_3$ is distortion of the see-through camera and:

$$D = \begin{bmatrix} k_1 & 0 & 0 \\ 0 & k_2 & 0 \\ 0 & 0 & k_3 \end{bmatrix} \qquad (37)$$

and $(k_1, k_2, k_3)$ are as defined above with respect to equation 34 (i.e., are radial distortion coefficients that are specific to each optical component). The focal length of the display lens may be represented as:

$$F_2 = F_3^{-1} F_h F_3^{-1} \qquad (38)$$

where $F_3$ is the focal length matrix of the see-through camera, $F_h$ is the focal length matrix of the headset, and $F_2$ is the focal length matrix of the display lens and:

$$F = \begin{bmatrix} f_x & 0 \\ 0 & f_y \end{bmatrix} \qquad (39)$$

and $(f_x, f_y)$ are as defined above with respect to equation 3 (i.e., are the focal lengths that are specific to each component). With the focal length matrix of the see-through camera $F_3$ and the focal length matrix of the headset, the focal length matrix of the display lens can be obtained.

Figure 18:
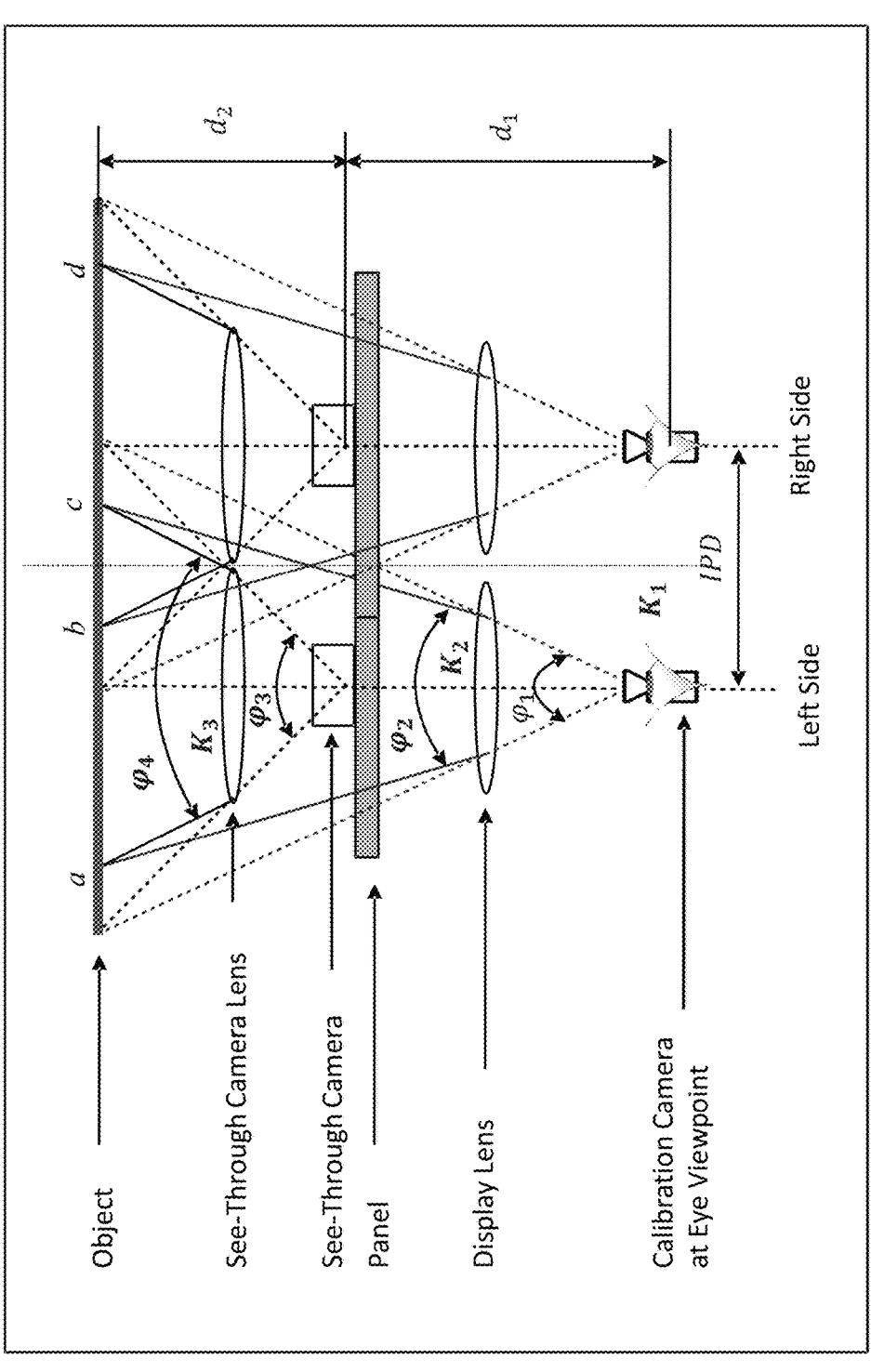
FIG. 18 illustrates an example of determining the field of view of the display lens and the see-through camera.

FIG. 18 illustrates an example of determining the field of view of the display lens and the see-through camera. In the configuration of FIG. 18, the distance between the eye viewpoint and the see-through camera viewpoint is $d_1$ and the minimum distance $d_2$ from the see-through camera viewpoint at which the object can be viewed at the edge of the field of view (points a, b, c, d). So, the field of view of the display lens can be computed with:

$$\tan\frac{\varphi_2}{2} = \tan\frac{\varphi_4}{2} \frac{(d_1 + d_2)}{d_2} \qquad (40)$$

where $\varphi_2$ is the field of view of the display lens after distortion correction and $\varphi_4$ is the field of view of the see-through camera after distortion correction.

Step 1520 of the example method of FIG. 15 includes storing the one or more system parameters and the one more display-lens parameters as a calibration for the video see-through AR system. Moreover, the resulting parameters, such as the camera matrices, distortion models, and other calibration parameters resulting from the process of FIG. 16, may be stored and used for future rendering. As one example, the processes of FIG. 16 provide several of the parameters used in the example process of FIG. 3, such as the camera matrices and distortion models of the see-through camera and the display lens. Moreover, certain parameters, such as the distortion center, are required for any AR rendering process, e.g., using the example headset of FIG. 17.

As another example, the parameters may be used to correct distortion, such as geometric distortion and chromatic aberration, caused by the headset, as illustrated in step 1616 of FIG. 16. Importantly, the calibration process results in parameters that can be used to correct both distortion in display of the real-world scene captured by the see-through cameras and the distortion in the virtual objects rendered on the system display. Real-world content, from the perspective of the viewer, is modified by both the see-through camera and the display lens, while virtual content passes through only the display lens (i.e., virtual content is not affected by the see-through camera, as the virtual content is not captured by that camera). Thus, corrections determined from both the see-through camera and the display lens can be made to real content, while corrections based only on the display lens can be made to virtual content. As a result, while real and virtual content is blended and rendered together on a display of the system, different corrections are made to these different content types, and therefore the user is able to see undistorted real and virtual content together, as the distortion corrections address the relevant components that affect the different types of content.

In particular embodiments, a video see-through AR system may include multiple cameras for capturing real-world content. In particular embodiments, a system may include several cameras. FIG. 19 illustrates an example system that includes 4 cameras for capturing real-world content. As illustrated in the example of FIG. 19, the four system cameras result in four left system "cameras:" (1) the combination of camera $A_1$ with the left lens $D_{left}$ (2) the combination of camera $A_2$ with the left lens $D_{left}$ (3) the combination of camera $A_3$ with the left lens $D_{left}$ and (4) the combination of camera A4 with the left lens Di eft. Each of these cameras represents an impact of the system on content viewed by a user on the left panel through the left lens, where the user's left eye is located at the location of the left virtual rendering camera $V_{left}$. Likewise, the four system cameras in the example of FIG. 19 result in four right system "cameras:" (1) the combination of camera $A_1$ with the right lens $D_{right}$ (2) the combination of camera $A_2$ with the right lens $D_{right}$ (3) the combination of camera $A_3$ with the right lens $D_{right}$ and (4) the combination of camera A4 with the right lens $D_{right}$. Each of these cameras represents an impact of the system on content viewed by a user on the right panel through the right lens, where the user's right eye is located at the location of the right virtual rendering camera $V_{right}$.

Including multiple cameras can provide more perspectives of a scene to a user and can increase the field of view of the system. For example, an object located near camera $A_1$ may substantially block $A_1$'s view of the scene behind that object, but by including other cameras, (e.g., $A_2$ and $A_4$), the view of the scene behind that object may still be obtained and displayed by the system.

In particular embodiments, a calibration process, such as the example process of FIG. 15 and the example process of FIG. 16, may be performed for each system "camera." For example, process 1601 in the example of FIG. 16 may be performed for each of the four left system cameras and for each of the four right system cameras illustrated in the example system of FIG. 19, while process 1620 may be performed four times (i.e., for each of the four see-through cameras used in the system). In particular embodiments, steps 1615 and 1616 may integrate the contribution of all a respective side's system cameras to determine that side's overall parameters. For instance, in the example of FIG. 19, the parameters (e.g., distortion models) of each of the four left system cameras may be combined to determine the parameters of the system's overall left "camera," and likewise for the right side. Thus, each camera-display lens pair provides a contribution to the overall system parameters (e.g., distortion corrections, distortion center, field of view, etc.) for the side corresponding to that display lens.

While the example of FIG. 19 illustrates using several see-through cameras, this disclosure contemplates that a system may include other types of cameras, such as a tracking camera, etc. These cameras may likewise go through a calibration process, such as the process of FIG. 16.

While the example of FIG. 16 uses a polynomial function to model the distortion of a lens and determines the coefficients in the polynomial function through the calibration procedure to obtain display lens distortion, alternative embodiments determine the distortion of each pixel with the calibration procedure and create a lookup table with the determined distortion of each pixel. A lookup table may be created for each color channel. During distortion correction, such embodiments apply the distortion lookup tables for corresponding color channels, therefore correcting both geometric distortion and chromatic aberration for the lenses. Distortion centers for the left and right sides can be obtained by looking for the pixels which have zero distortion in the lens with the lookup tables. The calibrated horizontal field of view can be obtained by identifying the most left pixels in the scene and the most right pixels in the scene, the calibrated vertical field of view can be obtained by identifying the most top pixels in the scene and the most bottom pixels in the scene in the lens within the lookup tables.

While equation 34 models the lens radial distortion with a polynomial function with three coefficients (k1, k2, k3), alternative embodiments adaptively change the number of the coefficients n. For example, a function may be used to detect how much distortion a lens creates. If there is no distortion, then no distortion correction is required, and n=0. If there is a small distortion, then embodiments may use one or two coefficients, n=1 or 2. If there is large distortion, more coefficients may be used, such that n>=3. Moreover, while the radial distortion function is used for modeling symmetric distortion of the lens, alternative embodiments may perform non-symmetric distortion calibration by applying other non-symmetric function such as spline function or some non-continuous functions according to properties of the lenses which need to be calibrated, rather than by using radial distortion functions.

Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order. Moreover, although this disclosure describes and illustrates particular components, devices, or systems carrying out particular steps of the method of FIG. 15, such as the computer system of FIG. 26, this disclosure contemplates any suitable combination of any suitable components, devices, or systems carrying out any suitable steps of the method of FIG. 15. Moreover, this disclosure contemplates that some or all of the computing operations described herein, including the steps of the example method illustrated in FIG. 15, may be performed by circuitry of a computing device, for example the computing device of FIG. 26, by a processor coupled to non-transitory computer readable storage media, or any suitable combination thereof.

In a video see-through AR system, a rendered virtual object may not match its intended placement within a real image of a real scene. For example, the rendered object may be in the wrong position, have the wrong orientation, have the wrong size, and/or may have incorrect coloring or geometry given the geometric distortions and chromatic aberrations of the system, etc., and these types of errors may be referred to as misregistration of the virtual object. FIG. 20 illustrates examples of these kinds of errors. For example, suppose a real object, such as bunny 2004 or turkey 2007, are captured by a video-see through camera and are displayed on a system display that has a 2D image plane 2002, as illustrated in scene 2000 of the example of FIG. 20 (in practice, the objects would be rendered on a left display and on a right display, respectively, although for convenience only one display in the example of FIG. 20 is shown). The system attempts to render virtual objects 2005 and 2006 that identically overlaps the respective real objects, but due to misregistration, the displayed virtual objects do not overlap the real objects. Scene 2050 illustrates examples of errors caused by misregistration, including angular errors, lateral errors, depth errors, and linear errors. Misregistration may be compounded due to that fact that objects or a video see-through AR system, or both, may be moving, and delays in video processing and object rendering can cause rendered objects to be misplaced within the dynamic scene.

In order to properly register rendered virtual objects and correct the errors caused by misregistration, embodiments of this disclosure calibrate the rendering process by creating a virtual rendering camera with a corresponding camera matrix and distortion model. As illustrated in the example of FIG. 20, virtual camera 2001 is placed at an eye location for viewing content on the display. A separate virtual camera is used for the left eye/left display and for the right eye/right display. The virtual camera may be treated as rendering the real-world information captured by the see-through camera and the virtual objects generated by the graphics pipeline.

Figure 22:
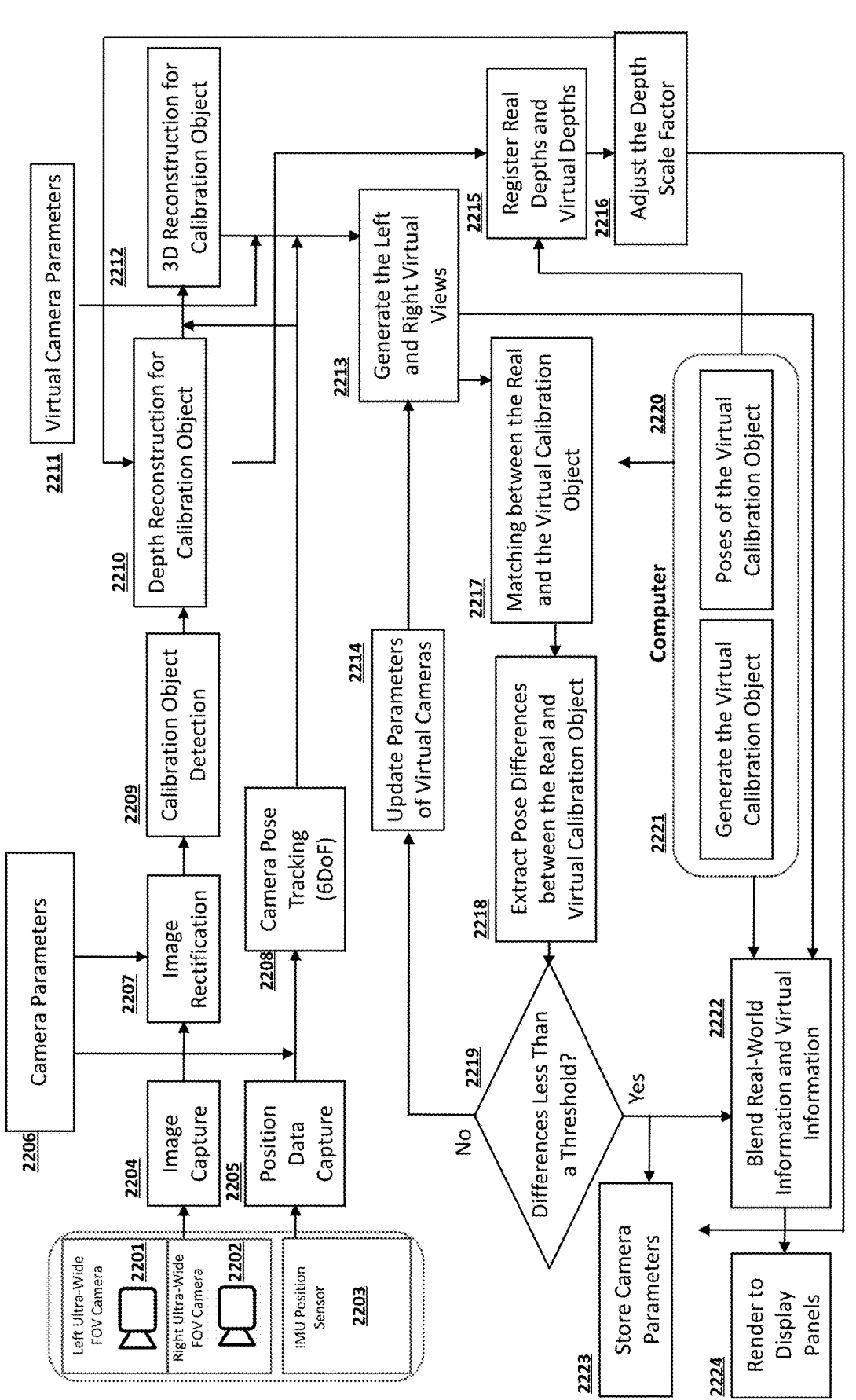
FIG. 22 illustrates an example process implementing the method of FIG. 21.
Figure 23:
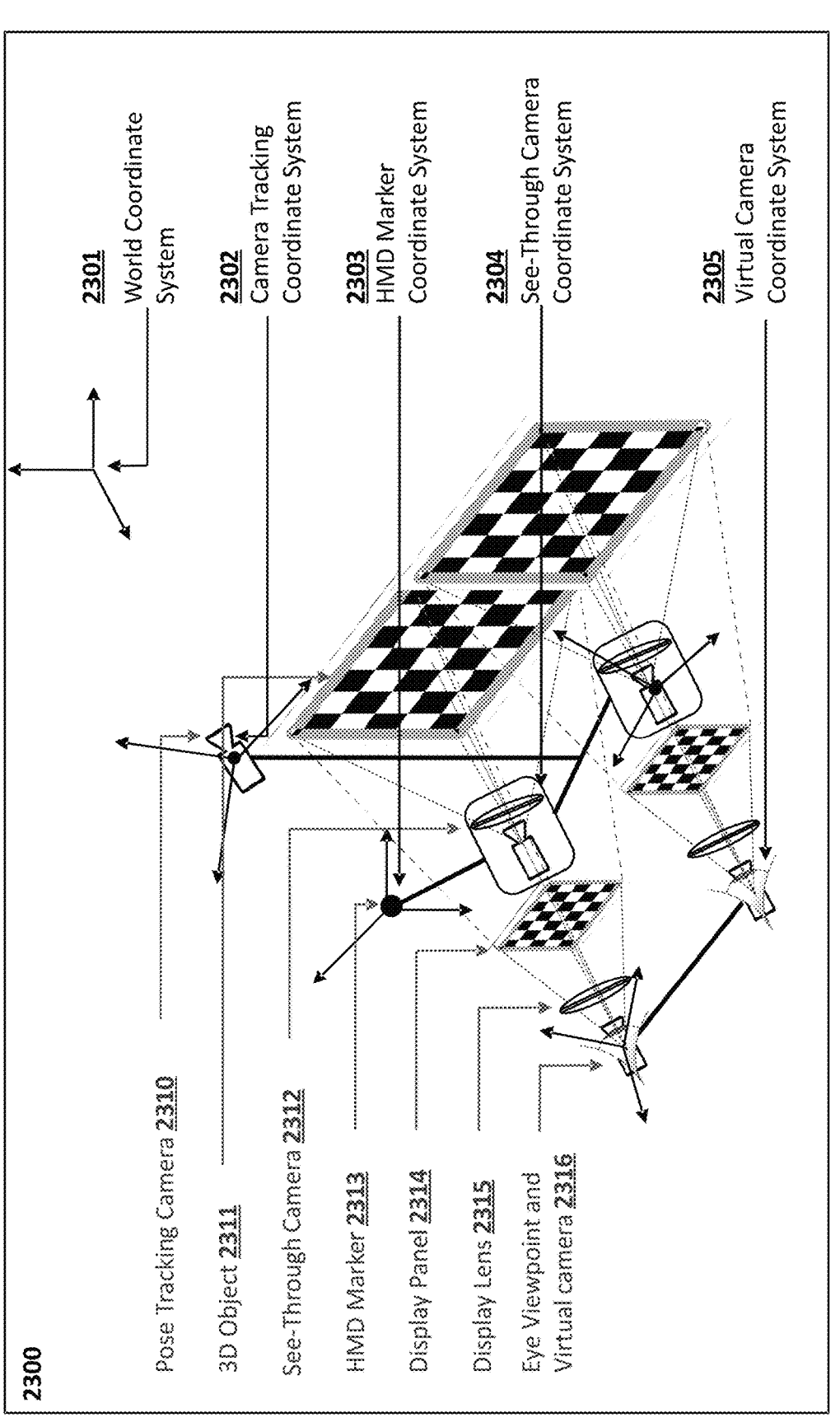
FIG. 23 illustrates an example architecture and coordinate system for performing dynamic object registration.

FIG. 21 illustrates an example method for virtual object registration. FIG. 22 illustrates an example process implementing the method of FIG. 21, and FIG. 23 illustrates an example architecture and coordinate system for performing dynamic object registration. The example method of FIG. 21 treats the rendering process as using a pair of virtual cameras, or rendering cameras, to perform object registration. As explained below, the method iteratively adjusts virtual camera parameters, if necessary, until virtual object mis-registration is below a threshold level. Among other things, the method corrects errors in the headset as a whole. For example, during any given manufacturing and installation of components of a video see-through AR system, such as lens components, camera components, etc., the components' actual parameters may vary from desired parameters. For example, stereo cameras may not be perfectly aligned with each other, or the distance between such cameras may not be identical to a desired or planned distance, or the cameras may be rotated from a desired orientation, or one or more lenses may have different optical properties than planned or desired or may be tilted from a desired orientation, or the eye relief may be different than planned, or intrinsic properties (e.g., camera matrices, focal lengths, etc.) may not be exactly as planned. Any and all of these errors, among other manufacturing and installation errors in assembling an instance of a system, can lead to object misregistration. The example method of FIG. 21 addresses these errors and provides corrections for these system-level errors such that displayed virtual objects are properly registered. As explained more fully herein, the calibration process determines virtual camera parameters specific to the particular instance of the system (e.g., headset) undergoing the calibration process.

Step 2105 of the example method of FIG. 21 includes capturing, using a pair of cameras of a video see-through AR system, stereo images of a predetermined calibration object having a predetermined pose. The predetermined object may be any suitable object that has known shape, size, and orientation (or pose). In particular embodiments, a user may select an object (e.g., a cube) an input the values of these parameters, or an object could be designed for use with a particular system. For example, an object may be included with a system, or a specific object may be used, e.g., by a manufacturer to perform the method of FIG. 21, prior to provisioning the system to a user. Moreover, while this example describes using a single predetermined calibration object, this disclosure contemplates that the procedure of FIG. 21 and/or FIG. 22 may use multiple calibration objects, each having known object attributes.

FIG. 22 illustrates an example in which a left ultra-wide field-of-view camera 2201 and a right ultra-wide field-of-view camera 2202 are used to capture stereo images in step 2204. Step 2110 of the example method of FIG. 21 includes obtaining, by a position sensor, position data for each of the pair of cameras at a time when the stereo images are captured. For example, FIG. 22 illustrates an IMU position sensor that captures position data of the cameras (e.g., by capturing position data of the system in which the cameras are fixed) in step 2205. This disclosure contemplates that any suitable position sensor or number of position sensors may be used to capture position data.

Step 2115 of the example method of FIG. 21 includes generating a 3D reconstruction of the calibration object based on the stereo images and the position data. For example, FIG. 22 illustrates that captured images may be rectified, for example by using camera parameters 206, such as camera matrices, focal lengths, and distortion models, for each of the left and right cameras. For example, the rectification procedure discussed above using camera models may be used to rectify the left and right images. The camera parameters, along with the image data and position data, may be used to perform camera pose tracking 2208, e.g., by tracking the camera pose in 6 degrees of freedom (6DoF). The calibration objects are detected and extracted from the rectified stereo image pair in step 2209, and the depth maps of the calibration object are reconstructed in step 2210. The depth maps and camera pose tracking are used to reconstruct the 3D shapes of the calibration object(s) in step 2212. In particular embodiments, the 3D reconstruction may be performed with volume-based 3D reconstruction such as TSDF. Alternative embodiments may instead use point-cloud techniques, and after capturing the images and reconstructing depth maps for these calibration object, point clouds of these objects are created in 3D space. The 3D object is detected and extracted from the point cloud, and the position and orientation of the extracted object are computed.

Step 2120 of the example method of FIG. 21 includes performing a virtual object registration process including steps 2125 and 2130. Step 2125 of the example method of FIG. 21 includes generating, using parameters of each of a pair of stereo virtual cameras, stereo virtual views comprising the predetermined calibration object based on the captured stereo images, the position data, and the 3D reconstruction, where each virtual camera of the pair of stereo virtual cameras is located at an eye position for viewing content on the video see-through AR system. For example, FIG. 22 illustrates that virtual camera parameters 2211, such as camera matrices, field of view, distortion models, etc. are used to generate left and right virtual views using the captured stereo images, the 3D reconstruction, and the camera poses. Each virtual camera, e.g., the left virtual camera and the right virtual camera, has its own set of associated virtual camera parameters. As illustrated, in e.g., FIG. 23, each virtual camera is located at an eye position for viewing content on the system, i.e., is located in the position that a user's eye (left eye and right eye, respectively) is supposed to be when viewing content on the system.

As illustrated in FIG. 22, a graphics pipelines can take the known pose of the predetermined calibration object in step 2220 and generate a virtual calibration object in step 2221. The virtual object can be generated using the known parameters of the predetermined calibration object, such as the shape, position, etc., which may be reconstructed from the depth data and the camera-position data discussed above. Then, as explained for example with respect to FIG. 25, the generated virtual object and the virtual views can be blended and rendered for display on the system, i.e., the left blended image is displayed on the left display and the right blended image is displayed on the right display.

Step 2130 of the example method of FIG. 21 includes determining, for each of the stereo virtual views, one or more differences between the predetermined calibration object in the virtual images and the virtual rendering of the calibration object. For example, once the blended views are displayed on the display, FIG. 22 illustrates in step 2217 that matching between the rendered real-world calibration object and the rendered virtual calibration object occurs and in step 2218, the differences between the two are determined. This determination is effectively made in 3D space, as the images are stereo images. The differences can be any suitable differences, such as a difference in size, shape, orientation (e.g., rotation), color and/or in an amount the objects are distorted.

Step 2135 of the example method of FIG. 21 includes when at least one of the determined one or more differences is greater than a corresponding threshold, then adjusting one or more parameters of at least one of the pair of stereo virtual cameras and re-executing the virtual object registration process. For example, each type of difference may be associated with a particular threshold, e.g., with a particular amount of translation between the two objects, a particular amount of rotation, a particular amount of distortion, etc. In particular embodiments, differences relative to predetermined thresholds may be considered as a whole, e.g., an allowable threshold may be higher if the two objects differ in only one respect, but if the objects differ appreciably in two respects, then the corresponding two threshold may be lower than they would be if considered separately. FIG. 22 illustrates decision 2219, which determines whether each difference is less than a threshold, and if not, then the parameters of the virtual cameras are updated in step 2214, and steps 2213, 2217, 2218, and 2219 are repeated with the updated virtual camera parameters. Virtual camera parameters may be updated by, for example, adjusting distortion coefficients to adjust object shapes; adjusting focal lengths to adjust scale, and adjusting principal points to shift the object.

Step 2140 of the example method of FIG. 21 includes when none of the one or more differences is greater than a corresponding threshold, then storing the parameters of each of the pair of stereo virtual cameras in association with the video see-through AR system. For example, FIG. 22 illustrates that the camera parameters are stored as registration parameters in step 2223, and these parameters may be subsequently used to blend real-world and virtual content in step 2222 and render that content to the display panels in step 2224. The parameters may be stored in any suitable location, such as on the system, on a device associated with the system, on a server device, etc. As explained above, these parameters are specific to the system that is calibrated, as they are based on correcting specific errors present in that system.

In particular embodiments, the calibration process of FIG. 21, such as the example calibration process of FIG. 22, may be performed each time the system undergoes a physical change. For example, if a user drops their system, then the calibration process may be repeated, e.g., to address changes in the relative position of the system components.

Particular embodiments may repeat one or more steps of the method of FIG. 21, where appropriate. Although this disclosure describes and illustrates particular steps of the method of FIG. 21 as occurring in a particular order, this disclosure contemplates any suitable steps of the method of FIG. 21 occurring in any suitable order. Moreover, although this disclosure describes and illustrates particular components, devices, or systems carrying out particular steps of the method of FIG. 21, such as the computer system of FIG. 26, this disclosure contemplates any suitable combination of any suitable components, devices, or systems carrying out any suitable steps of the method of FIG. 21. Moreover, this disclosure contemplates that some or all of the computing operations described herein, including the steps of the example method illustrated in FIG. 21, may be performed by circuitry of a computing device, for example the computing device of FIG. 26, by a processor coupled to non-transitory computer readable storage media, or any suitable combination thereof.

In particular embodiments, a registration calibration process may also address depth values. FIG. 22 illustrates an example process for calibrating depth values. The depth maps obtained in step 2210 are matched to the virtual depth information of the virtual calibration object generated by during steps 2220 and 2221. A depth scale factor is used to register the depth information of the rendered real calibration object and the rendered virtual calibration object in step 2215, and this depth scale factor is adjusted in step 2216 until the depths differ by less than a corresponding threshold. In the example of FIG. 22, the depth scale factor is stored with the registration/virtual camera parameters.

While the example methods of FIGS. 21 and 22 relate to video see-through AR, these methods can be extended to optical see-through AR. Before the registration process, a scene is created by placing the calibration object(s) in a designed, predetermined way. In the designed scene configuration, the poses of these calibration objects are known. The calibration objects are rendered by the graphics pipeline to the optical see-through AR device. The positions and orientations of these calibration objects in 3D space are extracted by the optical see-through AR device. After comparing the poses of the real-world objects and the virtual objects, the optical see-through system can register the virtual objects with the real-world object to calibrate the virtual cameras for the optical see-through system.

FIG. 23 illustrates example coordinate systems for use during dynamic object registration, such as for example the methods of FIGS. 21 and 22. In FIG. 2, a world coordinate system 2301 is defined with a global coordinate system for measurements of all activities of dynamic object registration. A camera tracking coordinate system 2302 is defined for camera tracking to obtain 6DoF camera poses. In the example of FIG. 23, this coordinate system is attached to the left camera of the stereo camera pair. A HMD (head-mounted display) marker coordinate system 303 is defined for measuring head movements to obtain 6DoF head poses. It is attached to the HMD device. A see-through camera coordinate system 304 is defined for measuring see-through camera movements to obtain 6DoF poses of the see-through camera. In the example of FIG. 23, this coordinate system is attached to the left see-through camera. If there are multiple see-through cameras, then the coordinate system is attached to one of them. A virtual camera coordinate system 305 is defined for the virtual rendering camera to render the virtual views to the headset panels. The virtual camera viewpoint is configured at the eye viewpoint as determined by headset parameters (e.g., the eye relief). The camera tracking coordinate system, the HMD marker coordinate system, and the see-through camera coordinate system are all rigidly connected. Thus, once a movement is known in a coordinate system such as the camera tracking coordinate system, the movement can be determined in any of the other rigidly connected coordinate systems.

Figure 24:
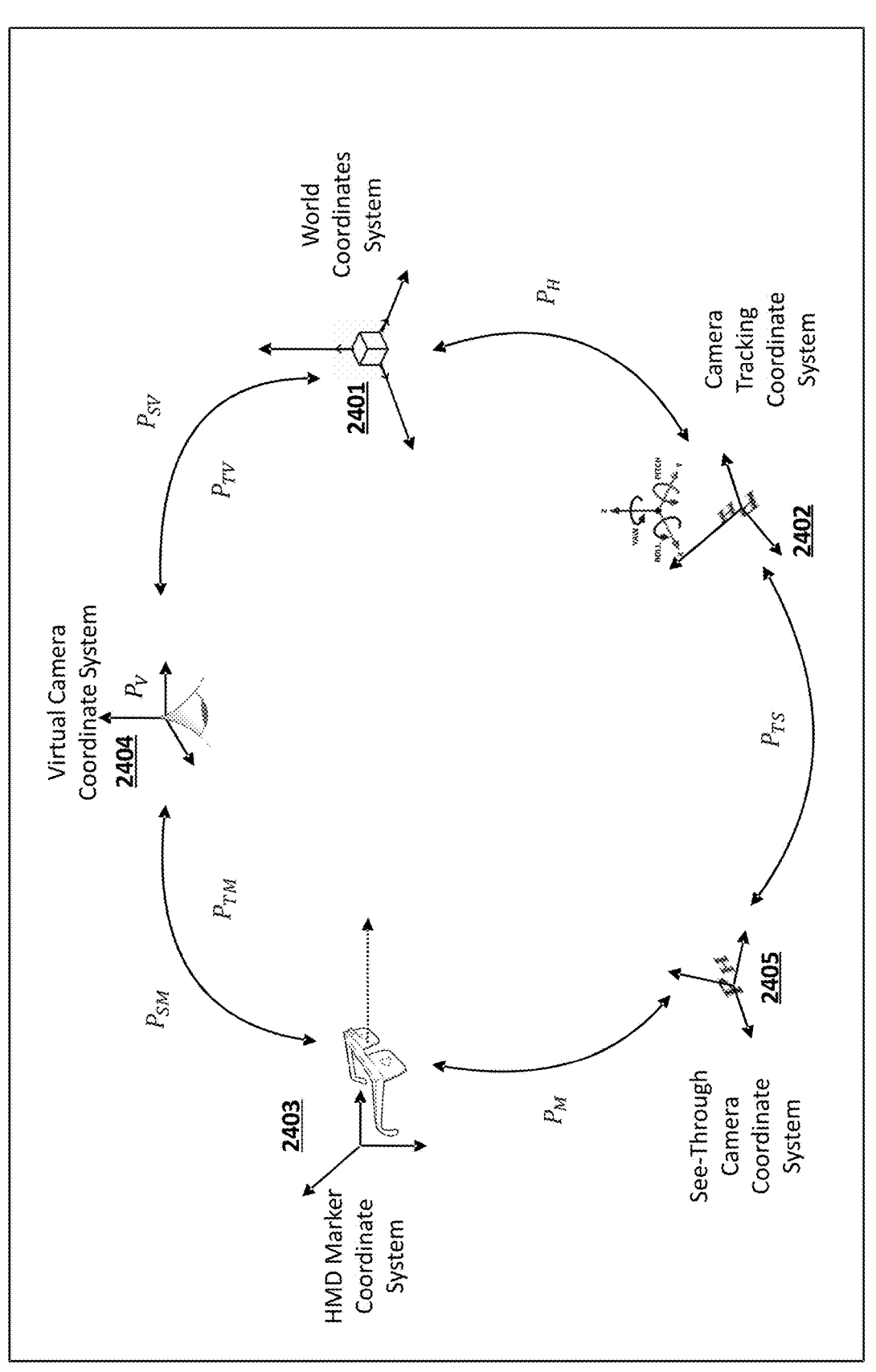
FIG. 24 illustrates an example of video transformation in dynamic object registration.

FIG. 24 illustrates an example of video transformation in dynamic object registration. The goal is to transfer the see-through camera to the virtual camera in the world coordinate system, so that embodiments can register the real-world objects captured by the see-through camera with the virtual objects created by the computer (e.g., by the GPU) and rendered by the virtual camera. This example uses the HMD marker to relate the HMD with all elements rigidly connecting to HMD to the world coordinate system.

$P_M$ is a pose of the HMD marker 2313, and can be expressed as:

$$P_M = [R_M | T_M] \tag{41}$$

where $R_M$ is a rotation matrix of the pose of the HMD marker and $T_M$ is a translation vector of the pose of HMD marker. $P_M$ is a 4×4 homogeneous transformation matrix that maps the HMD marker coordinate system 2403 of the HMD marker to the see-through coordinate system 2405. $P_M$ can be measured on the rigid connection between the HMD marker 2313 and the see-through camera 2312. In addition, a transformation $P_{SM}$ from the see-through camera 2312 to the HMD marker 2313 can be defined by:

$$P_{SM} = R_{SM}[l] - T_{SM} \tag{42}$$

where $R_{SM}$ is a rotation matrix between the see-through camera 2312 and the virtual camera and $T_{SM}$ is a translation vector between the see-through camera 2312 and the virtual camera, as explained below.

$P_{SM}$ is a 3×4 projection matrix that defines the see-through camera transformation 2312 relative to the coordinates of the HMD marker 2313. For a given system, such as a headset, the distances between the centers of the see-through camera 2312 and the virtual camera 2316 are measured to obtain the translation vector $T_{SM}$, and the angle distances between the centers of the see-through camera 2312 and the virtual camera 2316 are measured to compute the rotation matrix $R_{SM}$. Therefore, the overall transformation matrix $P_{SV}$ that maps the virtual camera center to the world coordinate system can be defined as:

$$P_{SV} = P_{SM} P_M P_H \tag{43}$$

where $P_{SV}$ is a 3×4 projection matrix that transforms world coordinates to virtual camera coordinates and $P_H$ is a 4×4 homogeneous transformation matrix that maps world coordinates to see-through camera coordinates.

In addition, a transformation $P_{TM}$ from the pose tracking camera 2310 to the HMD marker 2313 is defined by:

$$P_{TM}=R_{TM}[l]-T_{TM} \qquad (44)$$

where $R_{TM}$ is a rotation matrix between the pose camera 2310 and the virtual camera and $T_{TM}$ is a translation vector between the pose tracking camera 2310 and the virtual camera.

$P_{TM}$ is a 3×4 projection matrix that defines the pose tracking camera transformation 2310 relative to the coordinates of the HMD marker 2313. For a given headset, the distances between the centers of the pose tracking camera 2312 and the virtual camera 2316 can be measured to obtain the translation vector $T_{TM}$, and the angles between the pose tracking camera 2310 and the virtual camera 2316 are measured to compute the rotation matrix $R_{TM}$. Thus, the overall transformation matrix $P_{TV}$ that maps the virtual camera center to the world coordinate system can be defined as:

$$P_{TV}=P_{TM}P_{M1}P_H \qquad (45)$$

where $P_{TV}$ is a 3×4 projection matrix that transforms world coordinates to virtual camera coordinates and $P_H$ is a 4×4 homogeneous transformation matrix that maps world coordinates to pose tracking camera tracking coordinates.

$P_{M1}$ is a 4×4 homogeneous transformation matrix that maps the HMD marker coordinate system 2403 of HMD marker to the pose tracking camera coordinate system 2402. $P_M$ can be measured on the rigid connection between the HMD marker 2313 and the pose tracking camera 2310. In addition, a transformation $P_{TS}$ from the pose tracking camera 2310 to the see-through camera 2312 can be defined by:

$$P_{TS}=R_{TS}[l]-T_{TS} \qquad (46)$$

where $R_{TS}$ is a rotation matrix between the pose tracking camera 2310 and the see-through camera 2312 and $T_{TS}$ is a translation vector between the pose tracking camera 2310 and the see-through camera 2312. $P_{TS}$ is a 3×4 projection matrix that defines the pose tracking camera transformation 2310 relative to the coordinates of the see-through camera 2312. The matrix $P_{TS}$ is the desired projection matrix.

For a given headset, one can measure the distances between the centers of the pose tracking camera 2312 and the see-through camera 2312 to obtain the translation vector $T_{TS}$ and measure the angles between the pose tracking camera 2310 and the see-through camera 2312 to compute the rotation matrix $R_{TS}$. One can transform coordinates from the pose tracking camera coordinate system 2402 to the see-through coordinate system 2405.

Figure 25:
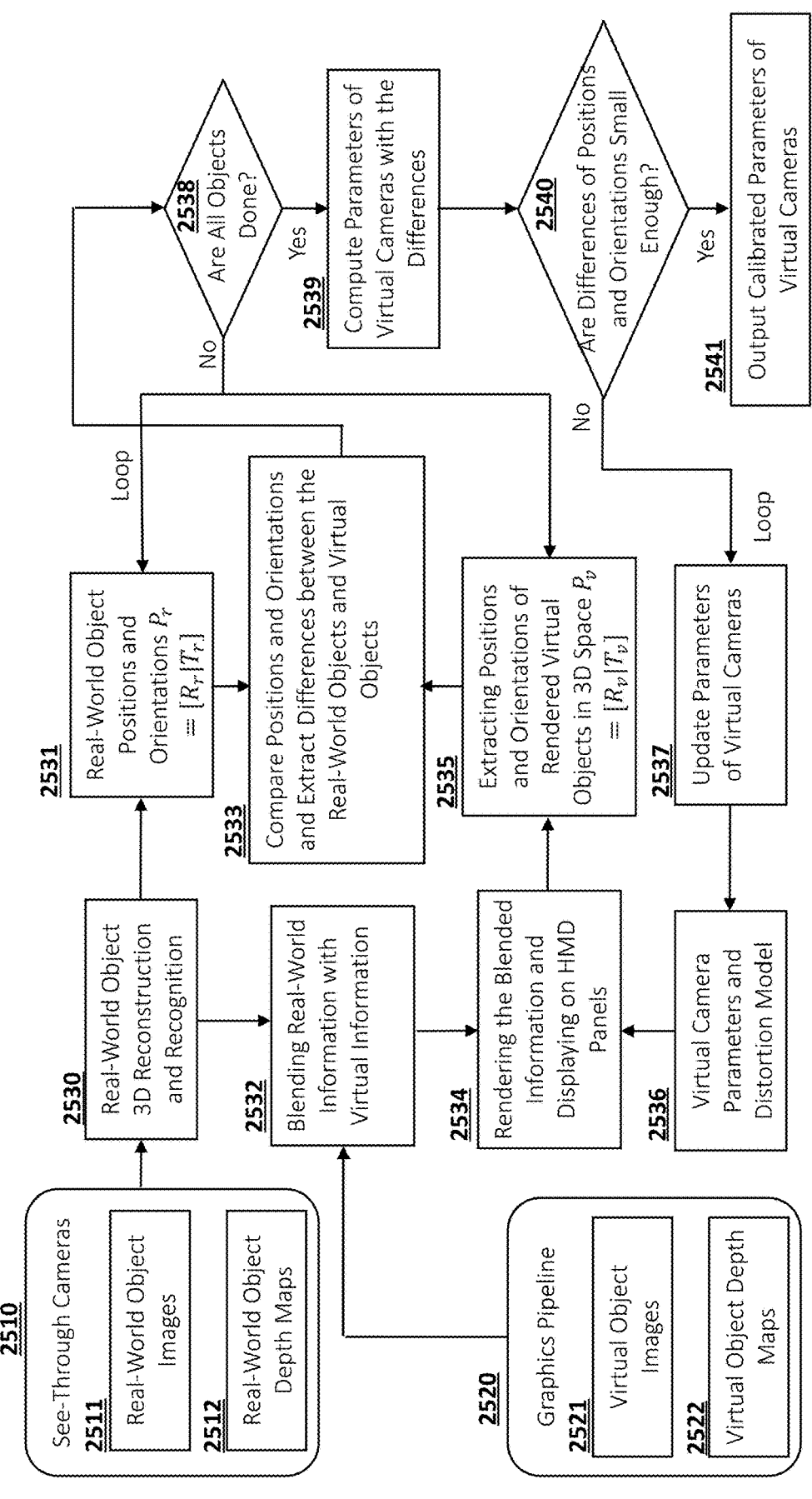
FIG. 25 illustrates an example algorithm for dynamic object registration.

FIG. 25 illustrates an example algorithm for dynamic object registration. This algorithm may be used, for example, by the example methods of FIG. 21 or 22. In FIG. 25, the calibration object (or objects, in particular embodiments) 2511 are captured by the video see-through cameras 2510 and depth maps of the calibration markers and objects are reconstructed from the images 2512. 6DoF camera poses are computed with the image sequence. 3D shapes of the calibration markers and objects 2530 are reconstructed with the images, depth maps, and camera poses. The virtual object images 2521 and depth maps 2522 of the calibration markers and objects are generated by the graphics pipeline 2520. The virtual calibration markers and objects are generated to overlap the real-world calibration markers and objects while viewing from the HMD, as discussed above with reference to FIG. 22.

The real-world calibration markers and objects 2530 reconstructed from the see-through cameras and the virtual calibration object(s) are blended together in step 2532. The blended information is rendered and displayed to HMD panels in step 2534 with virtual camera parameters 2536, which are discussed more fully herein.

The example of FIG. 25 extracts the positions and orientations 2535 of the virtual calibration markers and objects in 3D space with the HMD:

$$P_v=[R_v|T_v] \qquad (47)$$

where $P_v$ is a pose of a virtual object, $R_v$ is a rotation matrix identifying a rotation of the virtual object, and $T_v$ is a translation vector identifying the translation of the virtual object. Each of $P_v$, $R_v$, and $T_v$ are generated when the virtual object is generated. The positions and orientations 2531 of the real-world calibration markers and objects are computed from 3D object reconstruction 2530:

$$P_r=[R_r|T_r]) \qquad (48)$$

where $P_r$ is a pose of a real-world object, $R_r$ is a rotation matrix, and $T_r$ is a translation vector.

The example of FIG. 25 compares and extracts the differences of positions, orientations, etc. between the real-world object and virtual object 2533. This is done for all read-world objects and all virtual objects 2538. Then the parameters of the virtual cameras can be determined 2539 using the extracted differences 2533, for example by updating the existing virtual-camera parameters (e.g., the virtual camera matrix and distortion model generated during head-set calibration according to the example procedure of FIG. 16) with new, calibrated virtual-camera parameters.

If the differences between the real-world calibration markers and objects captured from the see-through cameras and the virtual calibration markers and objects generated by the graphics pipeline are small enough 2540 (e.g., are less than corresponding thresholds), the algorithm outputs the calibrated parameters of the virtual cameras. Otherwise, the algorithm replaces one or more current parameters of the virtual cameras 2537 with the calibrated parameters 2539 of the camera model 2536 and repeats the registration steps 2534, 2535, 2533, 2538, 2539, and 2540 until the differences between the real-world calibration markers and objects captured from the see-through cameras and the virtual calibration markers and objects generated by the graphics pipeline are small enough (e.g., are less than corresponding thresholds), and then saves the calibration results.

In particular embodiments, the example of FIG. 25 may be extended for depth calibration for the system. For example, markers may be placed in the real 3D space. The depths of the markers are known. These markers are rendered according to the procedure of FIG. 25, and then the depths of the virtual markers are extracted and compared with the depths of the real-world markers to calibrate the depth rendering.

Figure 26:
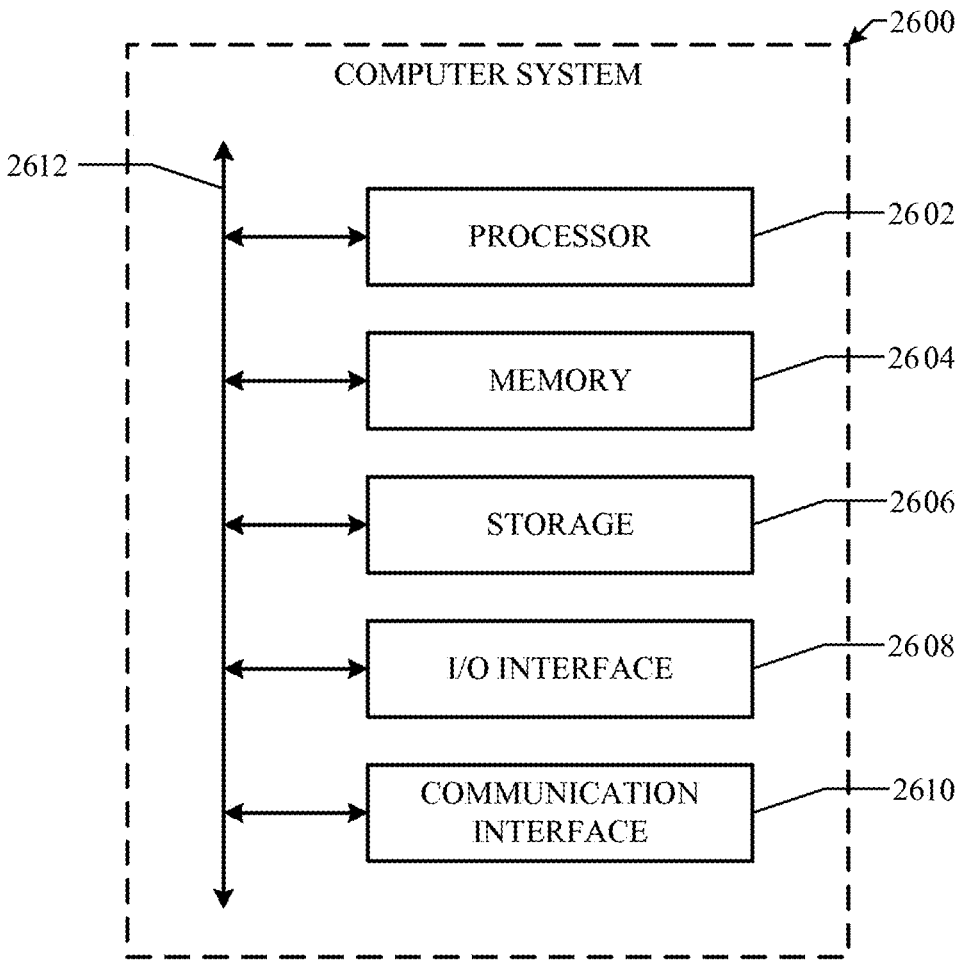
FIG. 26 illustrates an example computer system.

FIG. 26 illustrates an example computer system 2600. In particular embodiments, one or more computer systems 2600 perform one or more steps of one or more methods described or illustrated herein. In particular embodiments, one or more computer systems 2600 provide functionality described or illustrated herein. In particular embodiments, software running on one or more computer systems 2600 performs one or more steps of one or more methods described or illustrated herein or provides functionality described or illustrated herein. Particular embodiments include one or more portions of one or more computer systems 2600. Herein, reference to a computer system may encompass a computing device, and vice versa, where appropriate. Moreover, reference to a computer system may encompass one or more computer systems, where appropriate.

This disclosure contemplates any suitable number of computer systems 2600. This disclosure contemplates computer system 2600 taking any suitable physical form. As example and not by way of limitation, computer system 2600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 2600 may include one or more computer systems 2600; be unitary or distributed; span multiple locations; span multiple machines; span multiple data centers; or reside in a cloud, which may include one or more cloud components in one or more networks. Where appropriate, one or more computer systems 2600 may perform without substantial spatial or temporal limitation one or more steps of one or more methods described or illustrated herein. As an example and not by way of limitation, one or more computer systems 2600 may perform in real time or in batch mode one or more steps of one or more methods described or illustrated herein. One or more computer systems 2600 may perform at different times or at different locations one or more steps of one or more methods described or illustrated herein, where appropriate.

In particular embodiments, computer system 2600 includes a processor 2602, memory 2604, storage 2606, an input/output (I/O) interface 2608, a communication interface 2610, and a bus 2612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2602 includes hardware for executing instructions, such as those making up a computer program. As an example and not by way of limitation, to execute instructions, processor 2602 may retrieve (or fetch) the instructions from an internal register, an internal cache, memory 2604, or storage 2606; decode and execute them; and then write one or more results to an internal register, an internal cache, memory 2604, or storage 2606. In particular embodiments, processor 2602 may include one or more internal caches for data, instructions, or addresses. This disclosure contemplates processor 2602 including any suitable number of any suitable internal caches, where appropriate. As an example and not by way of limitation, processor 2602 may include one or more instruction caches, one or more data caches, and one or more translation lookaside buffers (TLBs). Instructions in the instruction caches may be copies of instructions in memory 2604 or storage 2606, and the instruction caches may speed up retrieval of those instructions by processor 2602. Data in the data caches may be copies of data in memory 2604 or storage 2606 for instructions executing at processor 2602 to operate on; the results of previous instructions executed at processor 2602 for access by subsequent instructions executing at processor 2602 or for writing to memory 2604 or storage 2606; or other suitable data. The data caches may speed up read or write operations by processor 2602. The TLBs may speed up virtual-address translation for processor 2602. In particular embodiments, processor 2602 may include one or more internal registers for data, instructions, or addresses. This disclosure contemplates processor 2602 including any suitable number of any suitable internal registers, where appropriate. Where appropriate, processor 2602 may include one or more arithmetic logic units (ALUs); be a multi-core processor; or include one or more processors 2602. Although this disclosure describes and illustrates a particular processor, this disclosure contemplates any suitable processor.

In particular embodiments, memory 2604 includes main memory for storing instructions for processor 2602 to execute or data for processor 2602 to operate on. As an example and not by way of limitation, computer system 2600 may load instructions from storage 2606 or another source (such as, for example, another computer system 2600) to memory 2604. Processor 2602 may then load the instructions from memory 2604 to an internal register or internal cache. To execute the instructions, processor 2602 may retrieve the instructions from the internal register or internal cache and decode them. During or after execution of the instructions, processor 2602 may write one or more results (which may be intermediate or final results) to the internal register or internal cache. Processor 2602 may then write one or more of those results to memory 2604. In particular embodiments, processor 2602 executes only instructions in one or more internal registers or internal caches or in memory 2604 (as opposed to storage 2606 or elsewhere) and operates only on data in one or more internal registers or internal caches or in memory 2604 (as opposed to storage 2606 or elsewhere). One or more memory buses (which may each include an address bus and a data bus) may couple processor 2602 to memory 2604. Bus 2612 may include one or more memory buses, as described below. In particular embodiments, one or more memory management units (MMUs) reside between processor 2602 and memory 2604 and facilitate accesses to memory 2604 requested by processor 2602. In particular embodiments, memory 2604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2604 may include one or more memories 2604, where appropriate. Although this disclosure describes and illustrates particular memory, this disclosure contemplates any suitable memory.

In particular embodiments, storage 2606 includes mass storage for data or instructions. As an example and not by way of limitation, storage 2606 may include a hard disk drive (HDD), a floppy disk drive, flash memory, an optical disc, a magneto-optical disc, magnetic tape, or a Universal Serial Bus (USB) drive or a combination of two or more of these. Storage 2606 may include removable or non-removable (or fixed) media, where appropriate. Storage 2606 may be internal or external to computer system 2600, where appropriate. In particular embodiments, storage 2606 is non-volatile, solid-state memory. In particular embodiments, storage 2606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2606 taking any suitable physical form. Storage 2606 may include one or more storage control units facilitating communication between processor 2602 and storage 2606, where appropriate. Where appropriate, storage 2606 may include one or more storages 2606. Although this disclosure describes and illustrates particular storage, this disclosure contemplates any suitable storage.

In particular embodiments, I/O interface 2608 includes hardware, software, or both, providing one or more interfaces for communication between computer system 2600 and one or more I/O devices. Computer system 2600 may include one or more of these I/O devices, where appropriate. One or more of these I/O devices may enable communication between a person and computer system 2600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2608 for them. Where appropriate, I/O interface 2608 may include one or more device or software drivers enabling processor 2602 to drive one or more of these I/O devices. I/O interface 2608 may include one or more I/O interfaces 2608, where appropriate. Although this disclosure describes and illustrates a particular I/O interface, this disclosure contemplates any suitable I/O interface.

In particular embodiments, communication interface 2610 includes hardware, software, or both providing one or more interfaces for communication (such as, for example, packet-based communication) between computer system 2600 and one or more other computer systems 2600 or one or more networks. As an example and not by way of limitation, communication interface 2610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2610 for it. As an example and not by way of limitation, computer system 2600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2600 may include any suitable communication interface 2610 for any of these networks, where appropriate. Communication interface 2610 may include one or more communication interfaces 2610, where appropriate. Although this disclosure describes and illustrates a particular communication interface, this disclosure contemplates any suitable communication interface.

In particular embodiments, bus 2612 includes hardware, software, or both coupling components of computer system 2600 to each other. As an example and not by way of limitation, bus 2612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2612 may include one or more buses 2612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

capturing, by a calibration camera that is not part of a video see-through AR system, a calibration pattern displayed on a display of a video see-through AR system comprising (1) a see-through camera that is distinct from the calibration camera (2) the display, configured to display content captured by the see-through camera and (3) a display lens configured to transmit light from the display, wherein:

the calibration camera is located at an eye position for viewing content on the video see-through AR system; and the displayed calibration pattern corresponds to an image of a calibration pattern captured by a see-through camera of the video see-through AR system;

determining, based on the captured calibration pattern, one or more system parameters of the video see-through AR system that represent combined distortion of the video see-through AR system caused by (1)

capturing an image for display by the see-through camera and (2) transmitting the displayed image through the display lens;

determining, based on an image of the calibration pattern captured by the see-through camera, one or more see-through camera parameters that represent distortion caused only by the see-through camera;

determining, based on the one or more system parameters and on the one or more see-through camera parameters that represent the distortion caused only by the see-through camera, one or more display-lens parameters that represent distortion caused only by transmitting the displayed image through the display lens; and storing the one or more system parameters and the one more display-lens parameters as a calibration for the video see-through AR system.

2. The method of claim 1, wherein the video see-through AR system comprises a headset.

3. The method of claim 1, wherein:

the see-through camera of the video see-through AR system comprises one of a pair of stereoscopic cameras; and the display of the video see-through AR system comprises one of a pair of displays.

4. The method of claim 3, further comprising performing the method of claim 1 for each display and see-through camera combination.

5. The method of claim 3, wherein the pair of stereoscopic cameras comprise one pair of a plurality of pairs of stereoscopic cameras of the video see-through AR system.

6. The method of claim 1, further comprising performing the method of claim 1 for each of a plurality of color channels.

7. The method of claim 1, wherein the combined distortion comprises one or more of: (1) geometric distortion or (2) chromatic aberration.

8. The method of claim 1, wherein the one or more system parameters of the video see-through AR system that represent combined distortion caused by the display lens of the video see-through AR system and caused by a camera lens of the see-through camera comprise a camera matrix for the video see-through camera and the display lens and a distortion model for the display lens and the video see-through camera.

9. One or more non-transitory computer readable storage media embodying instructions and coupled to one or more processors that are operable to execute the instructions to:

capture, by a calibration camera that is not part of a video see-through AR system, a calibration pattern displayed on a display of a video see-through AR system comprising (1) a see-through camera that is distinct from the calibration camera (2) the display, configured to display content captured by the see-through camera and (3) a display lens configured to transmit light from the display, wherein:

the calibration camera is located at an eye position for viewing content on the video see-through AR system; and the displayed calibration pattern corresponds to an image of a calibration pattern capture by a see-through camera of the video see-through AR system;

determine, based on the captured calibration pattern, one or more system parameters of the video see-through AR system that represent combined distortion of the video see-through AR system caused by (1) capturing an image for display by the see-through camera and (2) transmitting the displayed image through the display lens;

determine, based on an image of the calibration pattern captured by the see-through camera, one or more see-through camera parameters that represent distortion caused only by the see-through camera determine, based on the one or more system parameters and on the one or more see-through camera parameters that represent the distortion caused only by the see-through camera, one or more display-lens parameters that represent distortion caused only by transmitting the displayed image through the display lens; and store the one or more system parameters and the one more display-lens parameters as a calibration for the video see-through AR system.

10. The media of claim 9, wherein:

the see-through camera of the video see-through AR system comprises one of a pair of stereoscopic cameras; and the display of the video see-through AR system comprises one of a pair of displays.

11. A system comprising:

one or more non-transitory computer readable storage media embodying instructions; and one or more processors coupled to the non-transitory computer readable storage media, the one or more processors being operable to execute the instructions to:

capture, by a calibration camera that is not part of a video see-through AR system, a calibration pattern displayed on a display of a video see-through AR system comprising (1) a see-through camera that is distinct from the calibration camera (2) the display, configured to display content captured by the see-through camera and (3) a display lens configured to transmit light from the display, wherein:

the calibration camera is located at an eye position for viewing content on the video see-through AR system; and the displayed calibration pattern corresponds to an image of a calibration pattern capture by a see-through camera of the video see-through AR system;

determine, based on the captured calibration pattern, one or more system parameters of the video see-through AR system that represent combined distortion of the video see-through AR system caused by (1) capturing an image for display by the see-through camera and (2) transmitting the displayed image through the display lens;

determine, based on an image of the calibration pattern captured by the see-through camera, one or more see-through camera parameters that represent distortion caused only by the see-through camera determine, based on the one or more system parameters and on the one or more see-through camera parameters that represent the distortion caused only by the see-through camera, one or more display-lens parameters that represent distortion caused only by transmitting the displayed image through the display lens; and store the one or more system parameters and the one more display-lens parameters as a calibration for the video see-through AR system.

12. The system of claim 11, wherein:

the see-through camera of the video see-through AR system comprises one of a pair of stereoscopic cameras; and the display of the video see-through AR system comprises one of a pair of displays.

\* \* \* \* \*